United States Patent [19]
Laragione et al.

[11] Patent Number: 5,925,829
[45] Date of Patent: *Jul. 20, 1999

[54] METHOD AND APPARATUS FOR DETERMINING A RATE OF FLOW OF GAS BY A RATE OF CHANGE OF PRESSURE

[75] Inventors: Robert Laragione, Gap, Pa.; Dan B. LeMay, Fallbrook, Calif.; Eric J. Redemann, Laguna Niguel, Calif.; Michael D. Upchurch, Corona, Calif.

[73] Assignee: Unit Instruments, Inc., Yorba Linda, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,218

[22] Filed: Feb. 3, 1997

Related U.S. Application Data

[63] Continuation of application No. 08/614,326, Mar. 12, 1996, abandoned, which is a continuation of application No. 08/462,136, Jun. 5, 1995, abandoned, which is a continuation of application No. 08/376,060, Jan. 20, 1995, abandoned, which is a continuation of application No. 08/181,603, Jan. 14, 1994, abandoned.

[51] Int. Cl.$^6$ ........................................................ G01F 1/00
[52] U.S. Cl. ................................................................ 73/861
[58] Field of Search ................................... 73/861, 861.42, 73/861.44

[56] References Cited

U.S. PATENT DOCUMENTS

| | | | |
|---|---|---|---|
| 4,285,245 | 8/1981 | Kennedy | 73/861 |
| 4,364,413 | 12/1982 | Bersin et al. | 73/861 |
| 5,201,581 | 4/1993 | Vander Heyden et al. | 73/196 |

*Primary Examiner*—William Oen
*Attorney, Agent, or Firm*—Fitch, Even, Tabin & Flannery

[57] ABSTRACT

Method and apparatus for determining a mass rate of flow of gas by a rate of change of pressure includes an inlet for communicating a flow of gas from a source of gas whose mass flow rate is to be measured. A volumetric container is connected to the gas inlet to receive the gas. The volumetric container precisely defines a standard volume in its interior. Positioned within the volumetric container is a heat conductive assembly for maintaining the interior of the system substantially isothermal during pressure changes of the gas as gas flows into or leaves the container. Attached to the container is a pressure measuring transducer which measures the gas pressure within the container. The rate of change of the gas pressure under isothermal conditions within the container is indicative of the rate of mass flow of the gas into or out of the volumetric container.

12 Claims, 13 Drawing Sheets

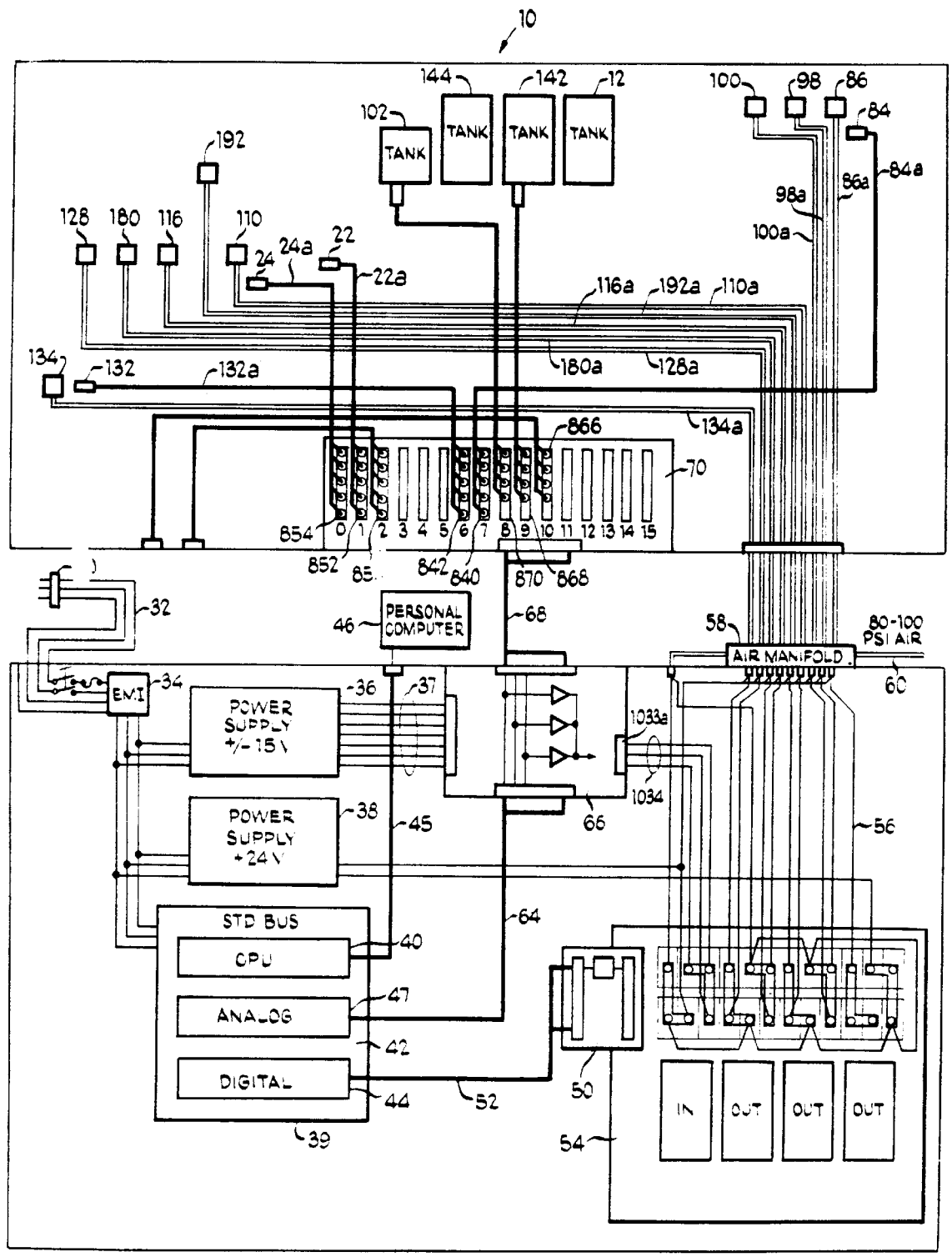

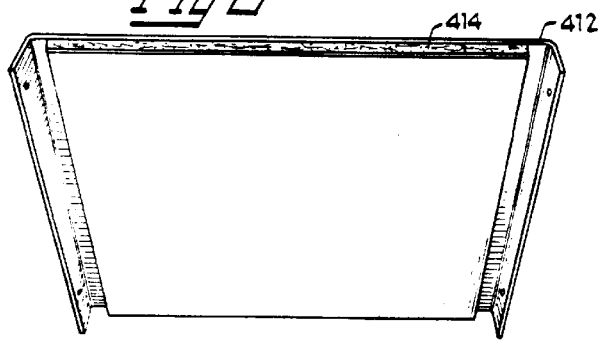
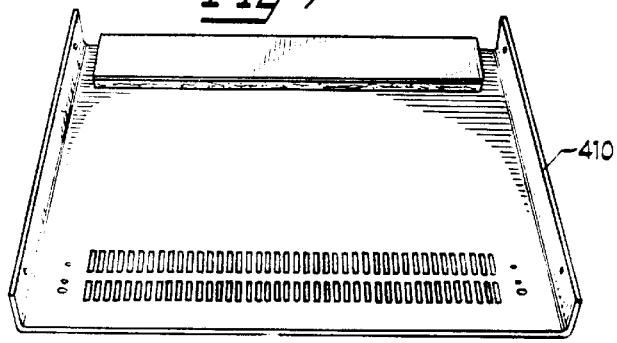
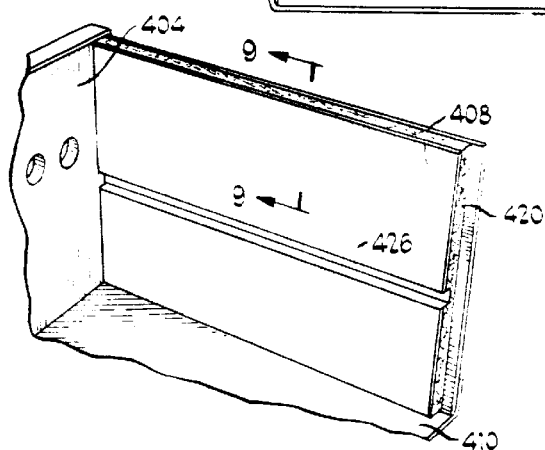
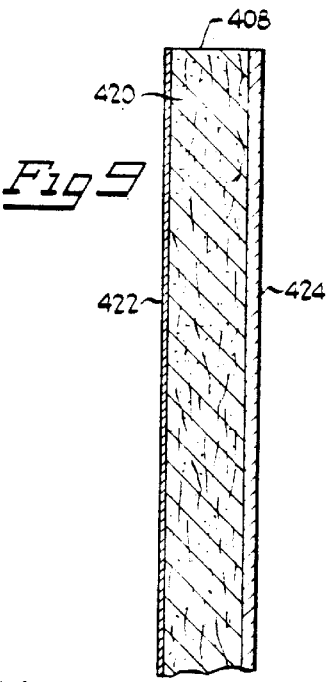
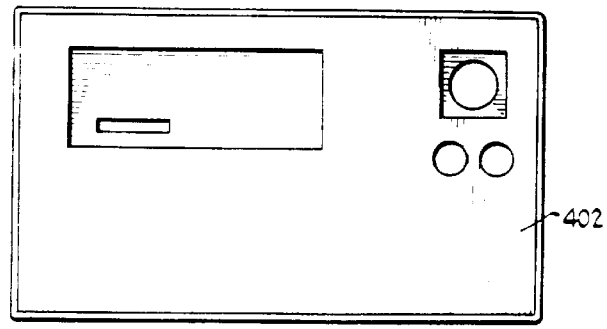

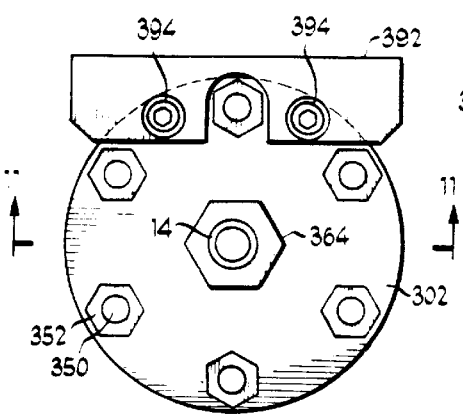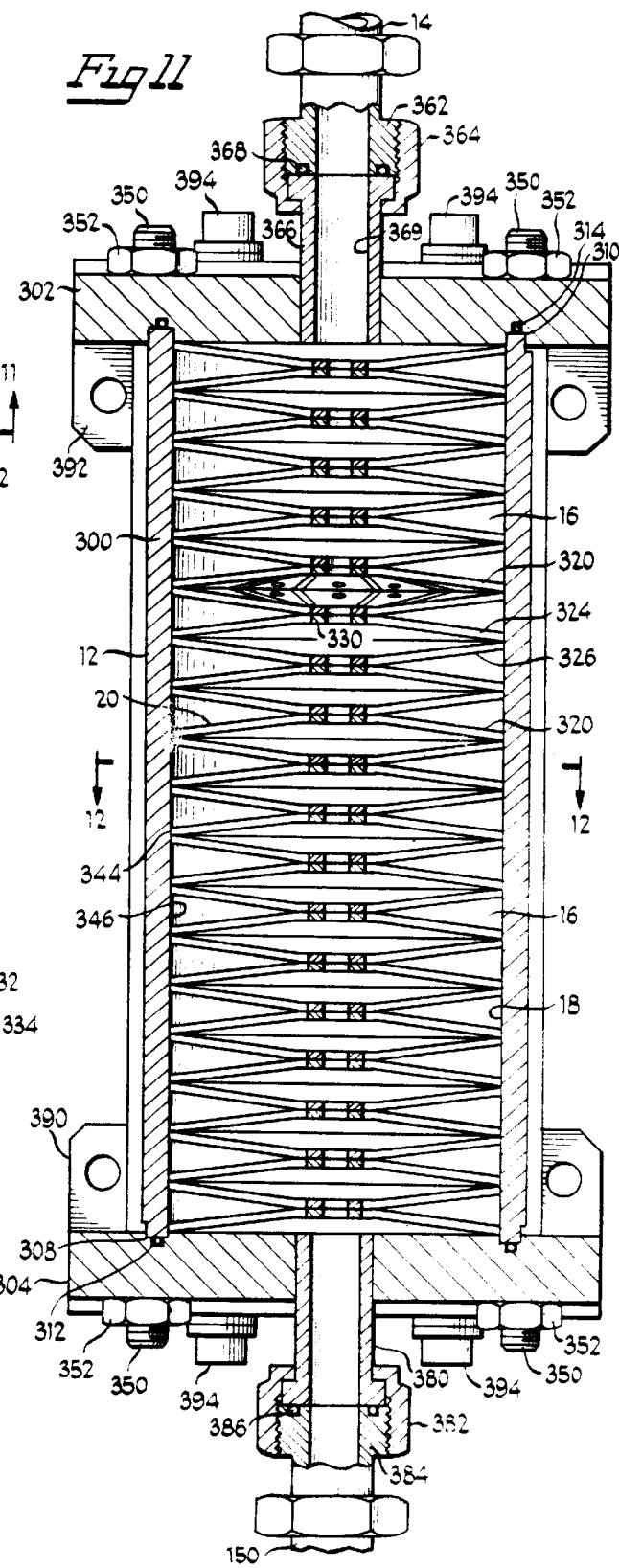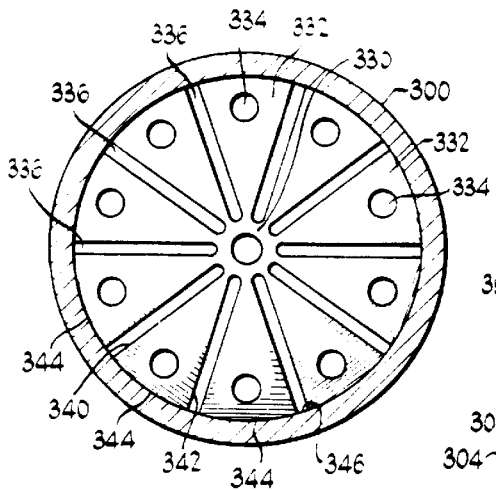

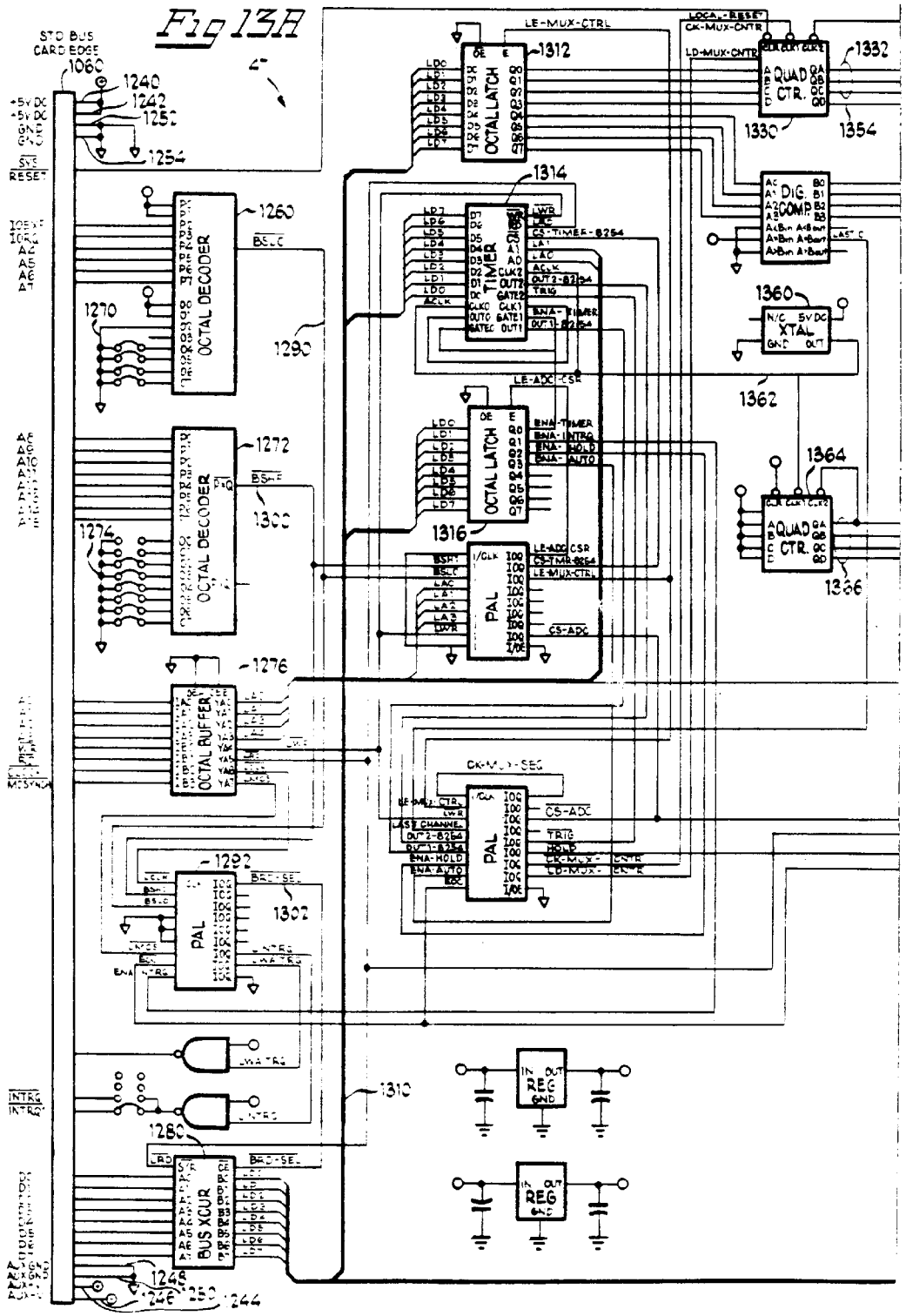

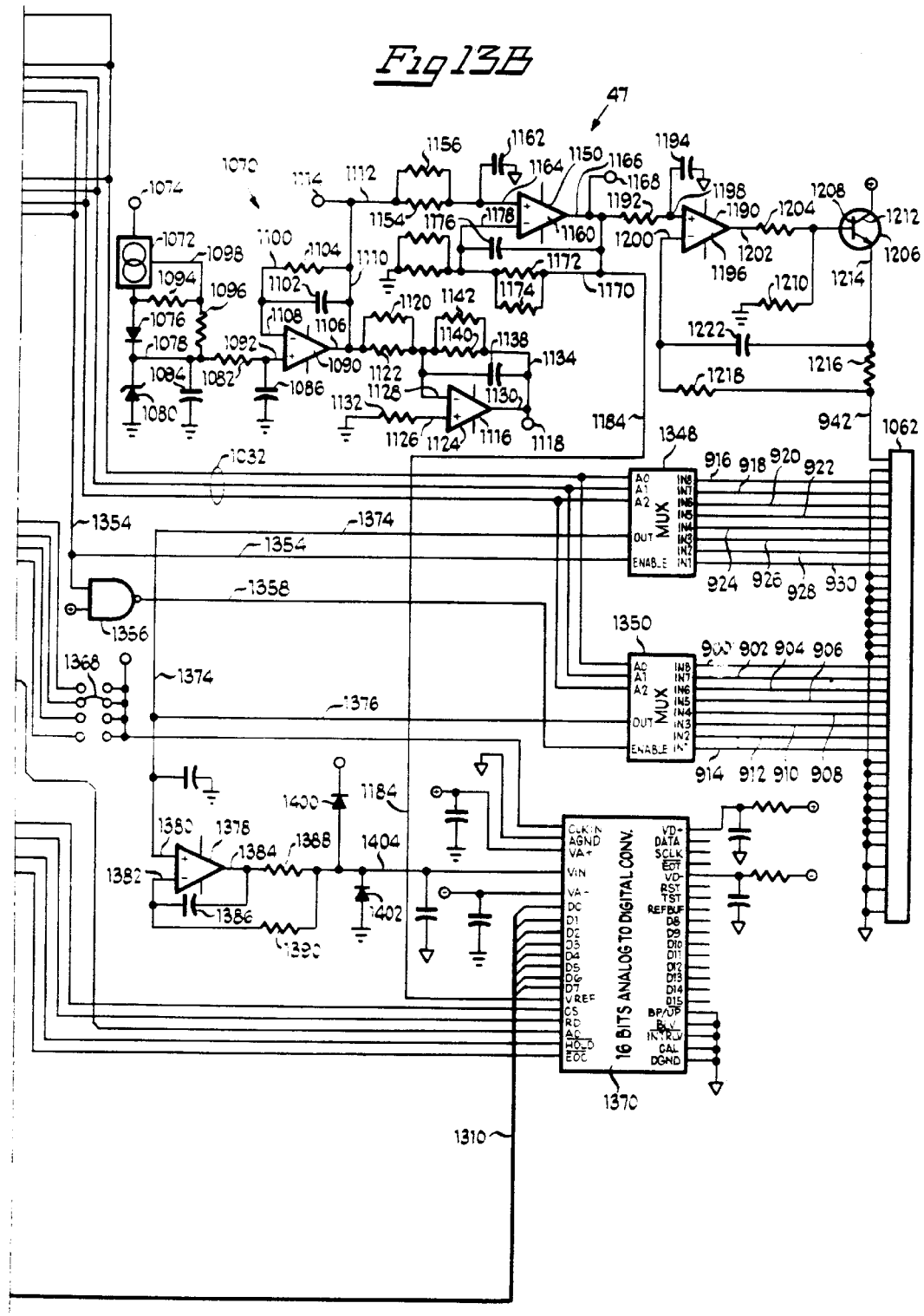

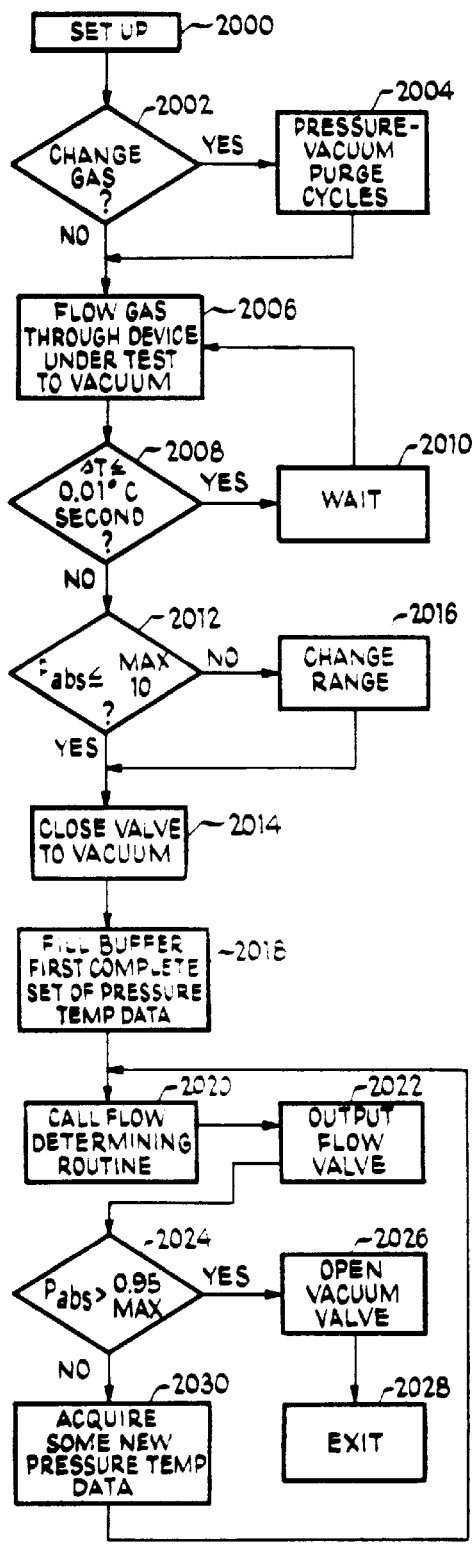
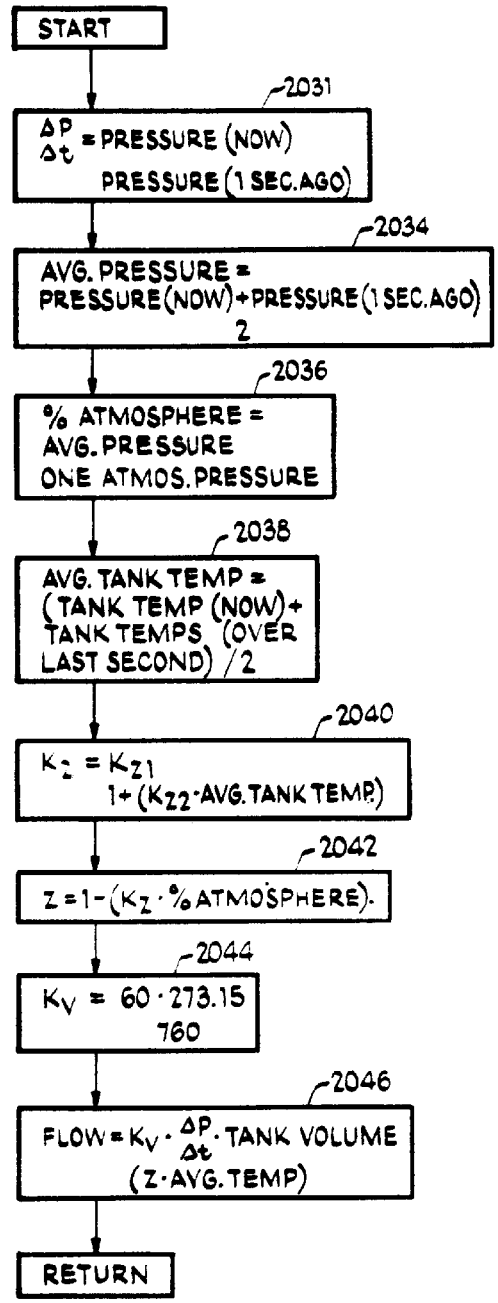

METHOD AND APPARATUS FOR DETERMINING A RATE OF FLOW OF GAS BY A RATE OF CHANGE OF PRESSURE

This is a continuation of application Ser. No. 08/614,326, filed Mar. 12, 1996, which is a continuation of application Ser. No. 08/181,603, filed Jan. 14, 1994, which is a continuation of application Ser. No. 08/376,060, filed Jan. 20, 1995, which is a continuation of application Ser. No. 08/462,136, filed Jun. 5, 1995, all of which are now abandoned.

BACKGROUND OF THE INVENTION

The invention relates generally to gas flow calibration systems and in particular to a gas flow calibration system which measures the rate of change of pressure in a gas flowing into a container maintained in a substantially isothermal or temperature invariant condition. The rate of change of the pressure under isothermal conditions is substantially indicative of the rate of mass flow causing the pressure change.

It is important in the manufacture of mass flow controllers and mass flow meters to calibrate them. A variety of calibration schemes are known, all of which suffer from one or more drawbacks. For instance, currently, bell provers are often connected upstream or downstream of mass flow controllers or mass flow meters to determine the actual rate of flow through the mass flow controller or mass flow meter being calibrated. The bell prover is a volumetric device that is similar to a graduated cylinder and has a movable piston positioned therein. A liquid seal is effected either by an oil film between the movable piston element and the walls of the cylinder or in some instances by mercury trapped between the piston and the walls of the cylinder. The oil has a tendency to vaporize or back stream causing possible contamination in the device under test. While the vapor pressure of mercury is typically lower than oil resulting in less mercury being lost during each measuring cycle, the mercury likewise can back stream into the device under test and contaminate it. Both the oil and mercury back streaming are significant and under today's standards of cleanliness for the manufacture of semiconductor devices, any measurable amounts of contamination are often too much to be tolerated. Bell provers all suffer from the drawback that the back pressure, against which the piston moves, may be significant in certain circumstances. For instance, if the pressure on the outside of the piston is ambient pressure or one atmosphere and if a mass flow controller or mass flow meter is to be calibrated for its flow characteristics for a low vapor pressure material in vapor state, the flow controller or flow meter cannot exhaust into a volumetric device such as a bell prover with one atmosphere back pressure because the vapor would be condensed in the lines or possibly even in the device under test, due to the high pressure. As a result, it would be necessary to pump the back pressure of the bell prover down and possibly to increase the overall temperature of the system to maintain the material in the vapor state. Thus, it is apparent that bell provers suffer from a number of drawbacks.

A secondary transfer standard in the form of a previously calibrated mass flow meter may also be coupled with the mass flow controller or mass flow meter under test. However, such a standard is a secondary and not a primary standard and would be less accurate than a primary standard.

It may also be possible to measure the rate of change of pressure of gas flowing into or out of a closed system which rate of change of pressure may be related in part to the mass flow rate of the gas. However, when gases are being compressed flowing into reservoir, the compression is normally an adiabatic compression wherein the internal energy of the gas increases in part due to an increase in temperature of the gas as it is being compressed. Thus, since part of the energy has gone into pressure volume work and another part of the energy into the increase in temperature, the change in pressure in and of itself is not indicative of the flow rate of the gas.

An additional problem associated with prior systems is that the particular rate of rise pressure measuring systems assume that the gas or vapor was a perfect, that is, that the gas or vapor obeyed the equation $$PV=nRT$$

Assuming for purposes of argument here that n the number of mols is equal to 1, the equation would ideally reduce to $$PV=RT$$

However, for real gases and vapors there is an implicit factor associated with the equation which may be written as $$PV=ZRT$$

Z is the so-called compressibility factor of the gases, a dimensionless factor that varies with the gas species and with pressure and temperature. It is well known that with certain gases such as sulfur hexafluoride and in particular with certain low vapor pressure vapors such as tungsten hexafluoride, the compressibility factor departs significantly from unity. Thus, in a conventional rate of pressure rise flow measuring device with both temperature and pressure changing, Z varies in a complicated way on a real time basis. That variability of the compressibility factor will lead to further errors in the mass flow that is determined from the rate of pressure rise.

What is needed is a method and apparatus providing for a highly accurate primary standard which will not contaminate the device to be calibrated such as a secondary or transfer standard, by back streaming; which is able to calibrate mass flow controllers or mass flow meters carrying low vapor pressure vapors, is independent of the changes in ambient pressure experienced by the calibrator and is not perturbed by compressibility effects causing the gas or vapor to depart from perfect gas behavior.

SUMMARY OF THE INVENTION

A method and apparatus for determining a mass rate of flow of gas by a rate of change of pressure includes an inlet for communicating a flow of gas from a source of gas whose mass flow rate is to be measured. A volumetric container precisely defining a standard volume in its interior is connected to the gas inlet to receive the gas. Positioned within the volumetric container is a heat conductive assembly for maintaining the interior of the volumetric container substantially isothermal during pressure changes of the gas or vapor as gas or vapor flows into or leaves the container. A pressure measuring transducer is attached to the container and measures the gas pressure within the container. The pressure measuring transducer produces an analog pressure signal that is converted to a digital pressure signal. The rate of change of the gas or vapor pressure under isothermal conditions within the volumetric container as reflected by the digital pressure signal is indicative of the rate of mass flow of the gas into or out of the volumetric container.

The instant invention relates generally to a rate of rise or rate of fall pressure system which is used to measure a mass flow rate of a gas. It is clear that such a system overcomes the problems associated with bell provers since the movable piston of the bell prover is done away with completely. Thus, it is not necessary to effect a liquid seal between a movable element and a stationary element and the vaporization problems associated with the oil films or with the back streaming of mercury are completely avoided.

In addition, the problem associated with bell provers with their inability to provide a sub-atmospheric pressure back pressure when testing on low pressure vapors is also avoided with a rate of pressure rise system as the rate of pressure rise system embodying the present invention can be operated over an arbitrarily low pressure range.

An important feature of the apparatus is the means for maintaining the gas in the isothermal relationship with the surroundings. This is provided by a plurality of vaned discs positioned within the volumetric tank in contact with the container wall to rapidly exchange heat between the gas and the wall of the container, thereby maintaining the gas very close to ambient temperature on a real time basis. In addition the tank wall is very thick to aid in rapid heat sinking or heat source to maintain the gas or vapor in an isothermal condition during pressure changes in the container as gas flows in or out.

The rate of pressure change apparatus embodying the isothermal means of the present invention may be used to calibrate a secondary transfer standard, as such a device is much more accurate than the secondary transfer standards presently known.

The invention also solves the problem associated with non-unity compressibility factors associated with gases such as sulfur hexafluoride and low vapor pressure vapors such as tungsten hexafluoride. The effect of a non-unity compressibility factor, for instance, results in a discrepancy between a perfect gas density and a real vapor density at normal test conditions. In addition, the compressibility factor varies with gas type and with both pressure and temperature. However, the gas type is always known and the instant apparatus includes the vaned discs which maintain the inside of the volumetric container in a substantially isothermal condition during a gas flow measuring run; therefore, the gas temperature is already held constant. The pressure, however, cannot be held constant as it is the rate of change of pressure which enables the measurement of the mass flow to be achieved. Thus, in order to determine the mass flow rate of the gas where the compressibility factor is other than 1, the instantaneous digitized pressure or the current pressure has subtracted from it in a CPU card the instantaneous pressure of one second previous to yield a rate of pressure change over a one second interval. An average pressure is also determined by adding the current pressure to the pressure from one second previous and dividing by 2 to produce the average pressure. A percent atmosphere determination is made by dividing the average pressure by a standard one atmosphere pressure. The tank temperature is also measured from time to time and the average of the tank temperature over the last second is determined. A $K_Z$ factor is determined by the following equation $$K_Z = \frac{K_{Z1}}{1 + (K_{Z2} \cdot T_{avg})}$$

The $K_{Z1}$ and $K_2$ factors for a positive gas or vapor are stored in tables. The values, which may depend on pressure and temperature are previously determined as set forth below. The compressibility factor Z is then determined by multiplying a factor $K_Z$ times the percent atmosphere to yield a compressibility factor offset quantity and subtracting the offset quantity from one which yields the compressibility factor. The actual flow is then calculated by multiplying a $K_V$ factor (215.6) by the rate of change of the pressure, times the volume of the volumetric container. That entire quantity, or product, is divided by the product of the compressibility factor Z times standard temperature, which is 273.15° K. to yield the mass flow rate of the gas or vapor through the device under test.

Since $$Z=1-(K_Z*P)$$

Both the $K_{Z1}$ and $K_{Z2}$ factors may be determined experimentally for a particular gas or vapor species by determining how far the gas species at given pressures and temperatures depart from ideal conditions, thus yielding the $K_{Z1}$ and $K_{Z2}$ factors. Those factors depending upon the gas or vapor, may be either fixed with respect to temperature and pressure or variable with respect to temperature and pressure and are stored in a look-up table in read-only memory or random-access memory from which they are accessed to compute the $K_Z$ factor which is then used to compute the compressibility at the given pressure and temperature, which compressibility factor is used to correct to give a proper mass flow rate.

It is a principal aspect of the invention to provide a method and apparatus for measuring a mass rate of flow of gas or vapor by an isothermal pressure increase into a known volume.

It is another aspect of the present invention to provide a rate of rise pressure measuring method and apparatus in which perturbations of pressure measurement signals due to departures of the gas or vapor from perfect gas conditions may be compensated for by taking into account a compressibility factor on the basis of real time modification of a pressure signal followed by determination of the rate of change of the modified pressure signal which is reflective of the mass rate of flow of the gas or vapor.

Other aspects of the invention will become obvious to one of ordinary skill in the art upon a perusal of the following specification and claims in light of the accompanying drawings.

BRIEF DESCRIPTION OF THE DRAWINGS

FIG. 5 is an internal sectional view taken along line 5—5 of FIG. 4 showing details of the interior of the cabinet shown in FIG. 4;

FIG. 6 is an elevational view of a bottom portion of the cabinet shown in FIG. 4;

FIG. 7 is an elevational view of the interior of the top portion of FIG. 4;

FIG. 8 is a broken-away perspective view of a portion of the cabinet of FIG. 4;

FIG. 9 is a sectional view of one of the walls of the cabinet showing details of insulation attached thereto taken generally along line 9—9 of FIG. 8;

FIG. 10 is an end elevational view of a volumetric container showing details of the mounting bracket thereof;

FIG. 11 is a sectional view taken substantially along line 11—11 of FIG. 10 showing details of the interior of the volumetric container having a plurality of vaned heat transfer discs positioned therein;

FIG. 12 is a sectional view taken substantially along line 12—12 of FIG. 11 showing details of the interior of the volumetric container including a vaned heat transfer disc;

FIGS. 13A and 13B are schematic diagrams of an analog circuit board shown in FIG. 1;

FIG. 18 is a schematic diagram of an analog interface board;

FIG. 19 is a flow chart of a main pressure determining routine; and

FIG. 20 is a flow chart of a pressure determining routine called by the main pressure determining routine.

DETAILED DESCRIPTION OF THE PREFERRED EMBODIMENT

Figure 2:
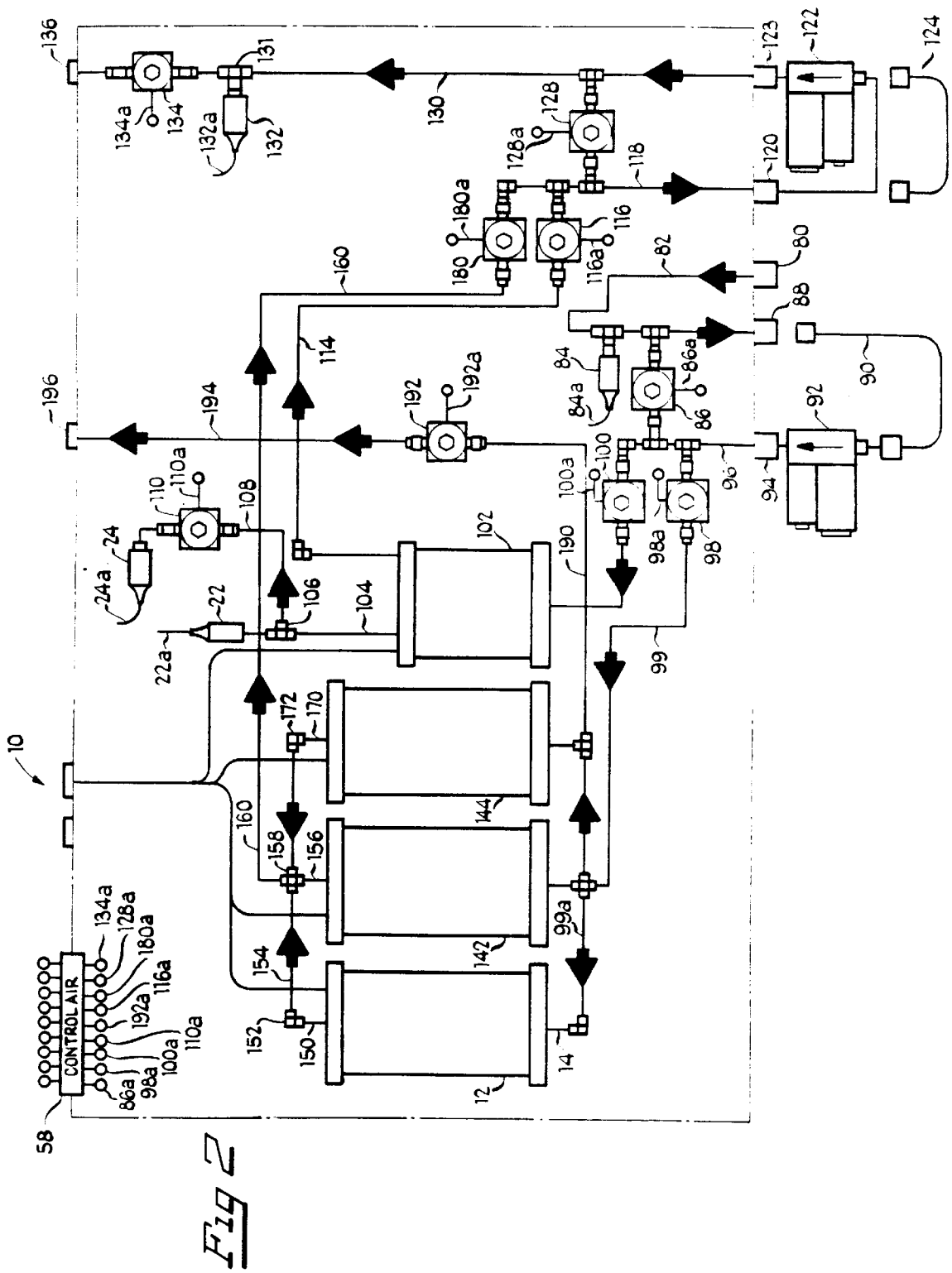
FIG. 2 is a schematic diagram of the gas handling plumbing of the apparatus shown in FIG. 1.
Figure 1B:
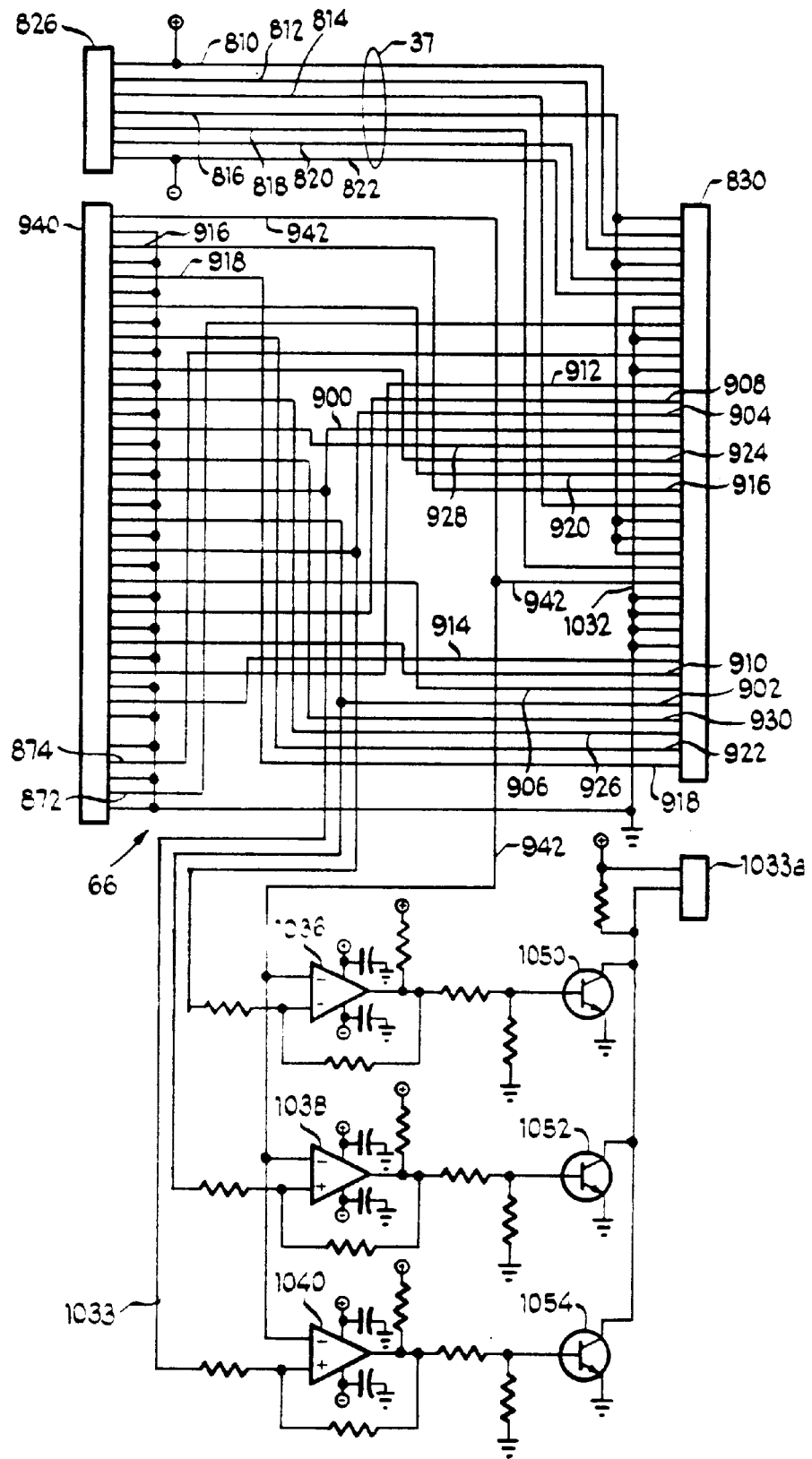
FIG. 1 is a block diagram of the apparatus for determining the mass rate of flow of gas by a rate of change of pressure embodying the present invention.

Referring now to the drawings, and especially to FIGS. 1, 2 and 11, an apparatus for determining a mass rate of flow of gas by rate of change of pressure is generally shown therein and identified by numeral 10. The apparatus 10 includes a volumetric container or tank 12 to which is connected a gas inlet 14 to receive a gas or vapor such as helium, nitrogen, oxygen, hydrogen, silane, dichlorosilane, tetraethoxysilane, sulfur hexafluoride, tungsten hexafluoride, hydrogen chloride, diborane, $BCl_3$ or $POCl_3$ from a source, the flow rate of which is to be measured. The term "gas" is used generally herein to mean a gas, a vapor or a combination thereof. The volumetric container 12 defines a standard volume 16 within its interior 18. A heat conductive assembly 20 is positioned in the interior volume of the volumetric container 12 to render the gas within the volumetric container 12 isothermal with respect to the surroundings of the container 12. A pair of pressure measuring transducers 22 and 24 having respective signal carrying leads 22a and 24a is coupled of the container 12 to produce an analog pressure signal related to the instantaneous pressure within the container 12. The rate of change of the instantaneous pressure signal is indicative of the mass rate of flow of gas into or out of the volumetric container 12.

Referring now to FIG. 1 an inlet plug 30 for receiving 115 V.A.C., 60 Hz alternating current power from a suitable source has connected to it a plurality of A.C. power leads 32 that are connected to an electromagnetic interference suppression device 34 to feed power thereto. The electromagnetic interference suppression device 34 uncouples high frequency transients from the A.C. source to prevent them from affecting other portions of the apparatus 10. A ±15 volt D.C. power supply 36 and a 24 volt D.C. power supply 38 are energized from the electromagnetic interference suppression device 34 to provide D.C. power. An 8-bit standard bus computer 39 is energized from EMI 34 and has a Model ZT 8808 V20 Single Board Computer as a central processing unit card 40 connected via a standard (STD) bus 42 to a Model ZT 8845 General Purpose I/O Board as a digital I/O card 44. The central processing unit card includes a microprocessor for execution of program code and both read only memory and random access memory for storage of the program code to be executed and the data to be operated upon. Both the ZT 8808 and the ZT 8845 are sold by Ziatech Corporation of San Luis Obispo, Calif. A serial bus 45 connects the CPU card 40 to an IBM-compatible personal computer 46 having a keyboard, a system unit and a monitor for input of system commands and output of flow rates and the like. An analog circuit 47 is also connected to the STD bus 42 to receive analog signals, convert them to digital signals and send the digital signals to the CPU card 40. The digital I/O card 44 is coupled to an interface 50 by a bus 52. The interface 50 is connected via an Opto-22 optical coupler 54 to the valve control bus 56 which controls solenoidal valves in an air manifold 58 driven from a supply of 80 to 100 psi high pressure air 60. The air manifold 58 is used to provide selectively air under pressure to open and close various valves in the gas plumbing system shown in FIGS. 2, 3 and 4 in greater detail. The analog circuit 47 communicates over an analog bus 64 with a communications module 66. The communications module 66 drives, via a bus 68, an analog back plane 70 having a plurality of analog ports coupled to portions of the apparatus 10.

Figure 3:
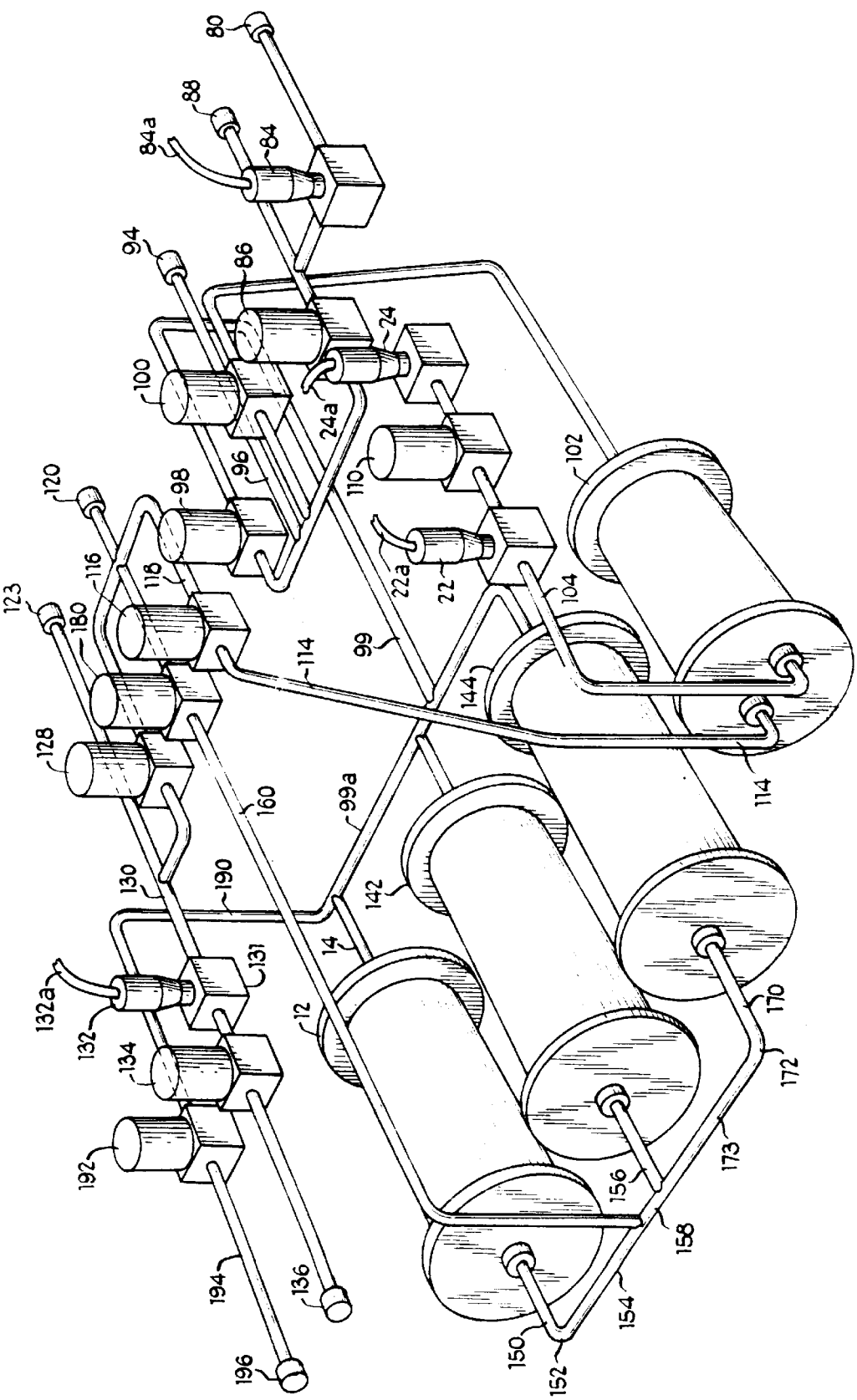
FIG. 3 is a perspective view of the gas handling plumbing of the apparatus shown in FIG. 1.
Figure 4:
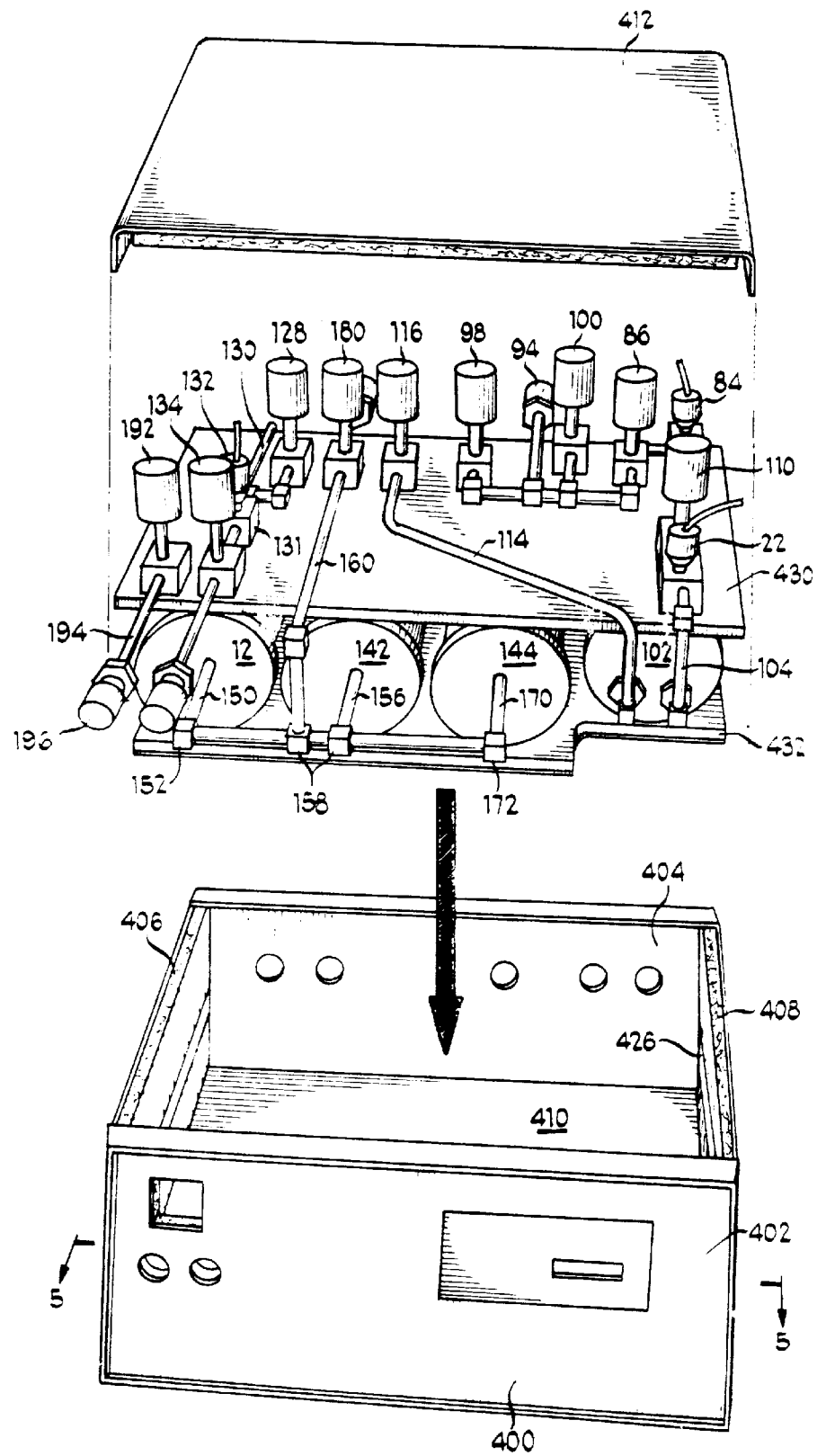
FIG. 4 is an exploded perspective view of a cabinet for holding the gas handling plumbing apparatus with details of the support structure thereof.

Referring now in particular to FIGS. 2, 3 and 4 gas, the mass flow rate of which is to be determined, is received by the apparatus 10 at a calibration port 80 which feeds a line 82 coupled to a 0–50 psi pressure transducer 84 having a pressure transducer signal lead 84a connected to it. The gas or vapor is then fed past a valve 86 having a pneumatic control line 86a connected to the air manifold 58 to an output port 88 which is coupled through a loop 90 to a device under test 92, in this instance a mass flow controller, but which also may be a secondary transfer standard mass flow meter. The gas flows through the mass flow controller 92 and into a device under test inlet port 94 connected to a gas line 96 coupled to a valve 98 having a pneumatic control line 98a connected to the air manifold 58 and a low flow rate valve 100 having a pneumatic control line 100a connected to the air manifold 58. The valves 98 and 100 are also coupled to the valve 86 to receive a flow of gas therefrom. In the event that a low flow rate flow controller is to be tested, the valve 98 is kept off, valve 100 is opened and the gas is allowed to flow into a 300 cubic centimeter volumetric container or tank 102. The tank 102 has coupled to it a pressure measuring line 104 having a T-fitting 106 coupled thereto and the 0–30 psi Druck pressure transducer 22. In the event that the flow rate is very low, the pressure is also being repeated over a line 108 to a valve 110 having a pneumatic control line 110a connected to the air manifold 58 which is opened in the low flow case, allowing the pressure to be transmitted to the 0–5 psi Druck pressure transducer 24. Once a measuring cycle has been completed, the valve 100 is closed, blocking additional flow into the tank 102 and the tank 102 is exhausted through an exhaust line 114 coupled to an exhaust valve 116 having a pneumatic control line 116a connected to the air manifold 58. The exhaust valve 116 can either exhaust directly through the line 118 to a suitable receptacle or, as is shown in this case, can be used as a feed line out of the exhaust port 120 to a flow controller 122 which may be used in order to test flow in a vacuum mode. It should be noted that a shunt line 124 may be connected between the port 120 and the port 123 to allow the gas to be so exhausted. In addition, if the shunt is not desired a valve 128, having a pneumatic control line 128a connected to the air manifold 58 and being coupled to the valve 116, allows a direct exhaust path to an exhaust line 130 which feeds the exhaust passed a 0–50 psi Druck pressure transducer 132 having a pressure transducer signal lead 132a connected to it. The line 130 feeds through a T-fitting 131 to an outlet valve 134 having a pneumatic control line 134a connected to the air manifold 58. The outlet valve 134 is connected to an outlet port 136.

In the event that a high flow rate mass flow controller 92 is the device under test, the valves 98 and 100 are opened allowing gas to flow not only into the tank 102 but also into the tank 12 and a volumetric container or tank 142 and a volumetric container or tank 144. Tanks 12, 142 and 144 are identical 500 cubic centimeter volume tanks each having an outlet. An outlet 150 is connected by an L-fitting 152 to the tank 12 and to a pressure transducer line 154. An outlet 156 is connected to a fitting 158 which is also connected to line 154 and carries the pressure over a line 160. Similarly, an outlet 170 is connected by a fitting 172 to the fitting 158. When the tanks 12, 102, 142 and 144 are all on line and parallel, the pressure within the tanks equilibrates and may be measured at high pressures by the pressure transducer 22 and at low pressures by the pressure transducer 24.

After the run has been completed, the valves 98 and 100 are closed and the gas is bled off through the line 160 which is connected to a valve 180 having a pneumatic control line 180a connected to the air manifold 58 as well as through the line 114. It may be appreciated that valve 180 can exhaust either through valve 128 or can cause flow through a loop including the mass flow controller 122.

Referring now to FIGS. 10, 11 and 12, the exemplary 500 cubic centimeter volumetric container or tank 12 is shown therein. The tank 12 includes a right circular cylindrical wall 300 composed of 316L stainless steel and having a 2.50 inches inside diameter, a 2.859 inches outside diameter and a length of 6.702 inches. The wall thickness of the cylinder is 0.359 inch. The tank wall thickness is large to aid in rapid heat transfer and sinking or sourcing from the heat transfer assembly 20. Connected to each end of the tank 12 are highly flat 0.500 inch thick 316L stainless steel tank covers 302 and 304. The right circular cylindrical wall 300 of tank 12 ends in a first edge 308 and a second edge 310. An O-ring 312 seals edge 308 with end plate 304. An O-ring 314 seals edge 310 with plate 302. The interior volume 14 is filled with a plurality of 0.060 inch thick 316L stainless steel discs 320 in disc pairs of which a disc 324 and a disc 326 are exemplary. Discs 324 and 326 are each slightly dished having center sections 330 which are substantially circular, from which extend a plurality of vanes 332, each vane 332 being angularly disposed at about 7° with respect to the planes of the center section 330. Each of the vanes 332 has a circular aperture 334 formed therein in order to allow the gas to flow through it. Slots 336 are defined between each of the vanes 332 further to allow the gas or vapor to flow free. The vanes 332 have a pair of edges 340 and 342 which respectively define the gas slots. An arcuate edge 344 engages an interior surface 346 of the wall 300 to provide good heat transfer therewith. When the tank 12 is assembled, the first end plate 302 is fitted to the cylindrical wall 300. The discs 320 are then stacked in opposing pairs in the manner shown but are only flexed to the point where they do not contact the walls of the tank 12 except sparingly. The end plate 304 is connected thereby compressing the discs via their center portions 330 causing the vanes 332 to splay outwardly bringing the edges 344 into contact with the wall 300. A plurality of elongated bolts 350 having nuts 352 connected thereto extend the length of the tank 12 to hold the two and plates 302 and 304 thereon.

It may be appreciated that gas communication may be effected via ports connected to the tank. The inlet line 14 is connected via a threaded fitting 362 held in place by a nut 364 to a tube 366. An O-ring 368 seals elements 362 and 366 together when the nut 364 is tightened. A bore 368 admits gas to the chamber 18. Likewise, gas can flow out of the chamber 18 through the fitting 380 to which is connected a nut 382 and a second fitting 384 with an O-ring 386 connected therebetween. A pair of angle brackets 390 and 392 are connected by Allen bolts 394 to the tank 12 and are used to support the tank 12 within a housing 400 which is shown in FIGS. 4, 5, 6, 7, 8 and 9. The housing 400 is substantially rectangular, having an end wall 402, another end wall 404, a pair of slotted side walls 406 and 408, a bottom wall 410 and a top wall 412. The top wall 412, as may best be seen in FIG. 6, includes an insulating layer 414. The bottom wall 410 is shown in FIG. 7. The side walls 408 and 410 have respective insulation layers 420 comprised of fiberglass insulation with a metal covering 422 thereover. An exterior wall supporting portion 424 extends outside. A slot 426 is formed in each of the walls 406 and 408 to accept a mounting plate 430 of the gas plumbing assembly. A bottom plate 432 rests on the bottom wall 410 when the device is assembled.

As is shown in FIG. 1 the apparatus 10 includes both pneumatic and gas handling components as well as electrical components. The general signal flow of the electrical components is such that signals generated by the CPU 40 are output by the digital I/O circuit 44 through the bus 52 to the interface 50. These signals are then fed through the Opto-22 coupler 54 through a plurality of valve bus signal lines 56 to the valves in the air manifold 58 to control the pressure within the air manifold lines. The pneumatic control lines then control their respective air valves to route gas under pressure to the measuring tanks and the like. Analog signals are developed at the flow measuring tanks 12, 102, 142 and 144 either by pressure transducers or by temperature sensing resistive temperature devices and are fed back through lines to the analog back plane 70 and through the bus 68. The analog temperature and pressure signals are then fed by the bus 68 through the connector 66 which includes an interrupt detector. The analog pressure and temperature signals are fed back through the connector 64 to the analog circuit 47 where they are converted by the analog circuit 47 to digital pressure and temperature signals that are sent to the CPU 40 by the STD bus 42. The CPU 40 then determines the rate of pressure rise which is indicative of the mass flow rate of the gas or vapor and may produce an output signal on the serial bus 45 which is fed to the personal computer 46.

Figure 15:
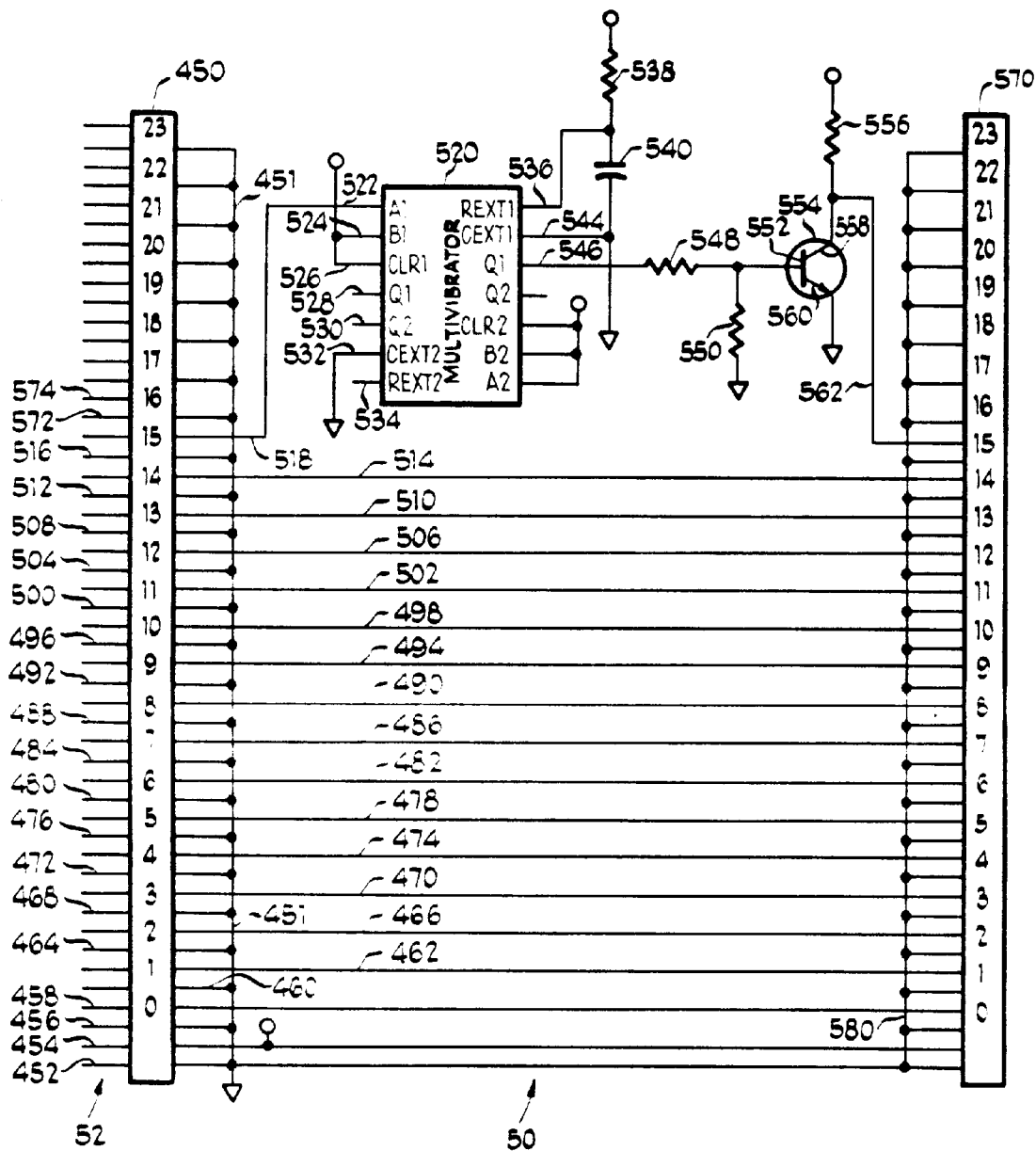
FIG. 15 is a schematic diagram of a digital interface circuit.

As is shown in FIG. 15 a 50-pin interface connector 450 is connected to the bus 52 both to provide ground loop current and driving current to a plurality of modules. A plurality of the bus 52 leads include a ground connector 451 which is coupled through to a parallel ground shunt lead 452. A +5 volt supply line 454 provides power to the opto coupler 54. A modular ground line 456 is paired with a MOD0 line 458. A ground line 460 is paired with a MOD1 line 462. A ground line 464 is paired with a MOD2 line 466.

A ground lead 468 is paired with a MOD3 lead 470. A ground lead 472 is paired with a MOD4 lead 575. A ground lead 476 is paired with a MOD5 lead 478. A ground lead 480 is paired with a MOD6 lead 482. A ground lead 484 is pared with a MOD7 lead 486. A ground lead 488 is paired with a MOD8 lead 490. A ground lead 492 is paired with a MOD9 lead 494. A ground lead 496 is paired with a MOD10 lead 498. A ground lead 500 is paired with a MOD11 lead 502. A ground lead 504 is paired with a MOD12 lead 506. A ground lead 508 is paired with a MOD13 lead 510. A ground lead 512 is paired with a MOD14 lead 514. A ground lead 516 is paired with a MOD15 lead 518. The MOD15 lead 518 feeds a 74HC123 multivibrator 520 at its A1 pin 522. The B1 and CLR1 pins 524 and 526 are strapped high. The Q1 and Q2 pins 528 and 530 are allowed to float. The Cext2 pin 532 is digitally grounded and the Rext2 pin 534 is allowed to float. The Rext1 pin 536 is connected to a resistor 538 at its junction with a grounded capacitor 540. The grounded capacitor 540 is grounded and is connected to a Cext1 pin 544. A Q1 pin 546 is connected to a 1 kilohm resistor 548 forming a voltage divider circuit with a 10 kilohm resistor 550. The node between the resistors 548 and 550 is connected to a base 552 of a 2N4401 NPN transistor 554 which is energized through a 10 kilohm resistor 556 connected to its collector 558. Its emitter 560 is connected to ground. A lead 562 connects the junction between the resistor 556 and the collector 558 to an output 50-pin connector 570 which is connected to the Opto-22 coupler 54.

A ground lead 572 is paired with a MOD16 lead 574 which is allowed to float. Although other ground leads are also strapped low, other mod input leads 17 through 23 are not connected through the 50-pin connector 450. The leads for the ground signals, the +5 volt signals and MOD0 through MOD14 are connected straight through from the connector 450 to the connector 570 and on into the opto coupler 54. The MOD15 lead output to the opto coupler is the output of the multivibrator which provides a pulse stretching interface. A strapped ground lead 580 connects all of the ground connections of the connector 570 to the ground lead 450. The signals on the MOD0 through MOD15 leads are used to drive the opto coupler 54 which, in turn, drives the valves of the air manifold 58.

Figure 16:
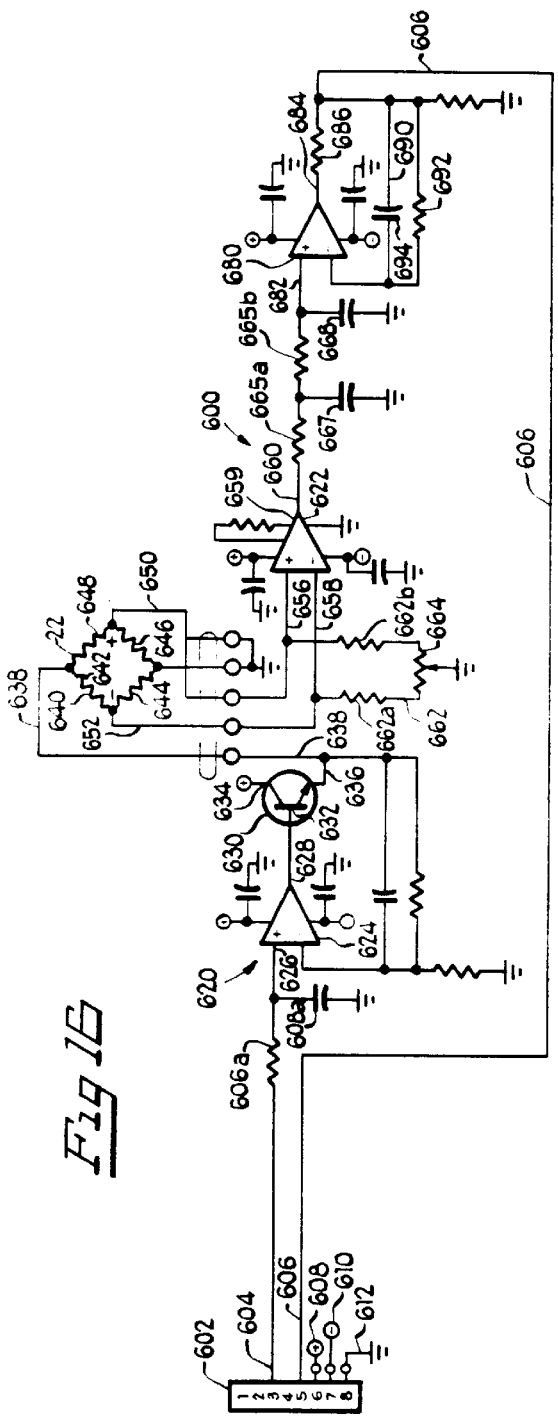
FIG. 16 is a schematic diagram of a pressure transducer module.

Once the valves have been cycled to allow the gas to flow into the tanks and the tanks beginning filling up, the pressure readings from the pressure transducers are changing. The pressure transducers 22 or 24 develop electrical signals which are fed back to the CPU card. As may best be seen in FIG. 16, a pressure transducer circuit 600, as will be seen hereinafter, the circuit 600 includes an 8-pin connector 602 which receives a +4.5 volt reference signal at pin 3 through a line 604, supplies an analog pressure transducer output signal at a line 606 through a pin 5, receives a +15 volt power supply signal at line 608 and a −15 volt power supply signal at line 610. A ground is provided at a line 612. The pressure transducer module 600 includes a voltage regulator portion 620 which drives a pressure transducer, for instance transducer 22. Pressure transducer 22 provides an output signal to an amplifying section 622 which drives the voltage output line 606. The voltage reference signal supplied on line 604 is fed to a 499 ohm resistor 606a. Transients are coupled off through a 0.1 microfarad capacitor 608a, which is grounded. The signal is then fed to an LT1013 operational amplifier 624 at its non-inverting pin 626. The amplifier is an LT1013 and has an output pin 628 coupled to a BCW60 NPN transistor 630 at its base 632. The NPN transistor 630 is fed at its collector 634 from leads 608 and has an emitter 636 coupled to a line 638 which is connected to the pressure transducer 22. The pressure transducer 22 includes a bridge circuit 640 having resistances 642, 644, 646 and 648 and is operable such that bridge balance signals are changed by changes in pressure, which balance signals are fed through leads 650 and 652 to the non-inverting input terminal 656 and the inverting input terminal 658 of an AD620 instrumentation amplifier 659. A D.C. bias is effected to the inverting input terminal 656 and a non-inverting input terminal 658 by a biasing circuit 662 having a pair of 499 kilohm fixed resistors 662a and 662b having a grounded 500 kilohm potentiometer 664. The output signal is fed to an 8.06 kilohm resistor 665a and an 8.06 kilohm resistor 665b. A pair of capacitors 667 and 668 are grounded and feed an LT1013 operational amplifier 680 at its non-inverting terminal 682. The amplifier 680 also includes an output terminal 684 which supplies an output signal through a 100 ohm resistor 686 to the lead 606. A feedback path 690 includes a parallel 16.2 kilohm resistor 692 and a 2200 picofarad capacitor 694. Thus, the pressure transducer 22 is energized by the regulated voltage supplied from the voltage regulator 620 to produce a transducer signal that is amplified by the instrumentation amplifier 622, and the amplifier 680 provides an instantaneous analog pressure signal on the lead 606.

Figure 17:
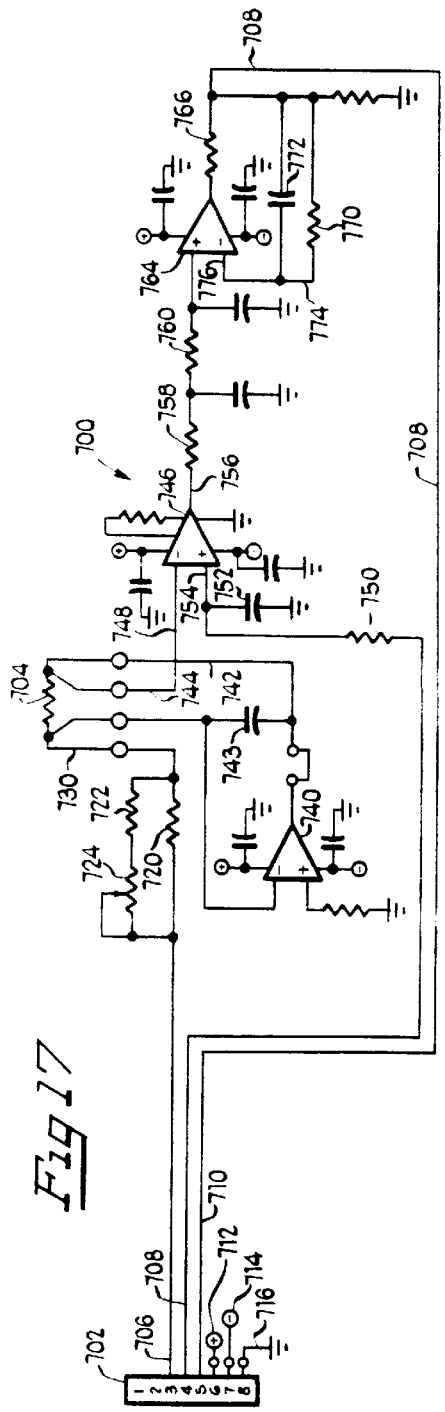
FIG. 17 is a schematic diagram of a temperature module.

In addition, the temperature of each of the tanks may be sensed to make sure that the tanks do not depart from isothermal condition while the pressure is changing. A departure of the tank from isothermal condition will cause isentropic flow rate model assumptions to be invalid and would result in an error. In order to detect changes in temperature of the tank, a temperature input module 700 is associated with the tanks. As may best be seen in FIG. 17, the temperature input module 700 may also be coupled through an 8-pin connector 702 to other portions of the apparatus 10. In this embodiment the 8-pin connector 702 has pin 3 connected to the 4.5 volt reference voltage which is used to provide constant current to an RTD temperature sensor 704. More specifically, the pin 3 is connected to a lead 706. A pin 4 is connected to a −100 millivolt reference signal and coupled to a lead 708. Pin 5 is connected to a lead 710 which is a voltage output lead. Pin 6 is connected to a lead 712 which provides +15 volts from the power supply. Pin 7 is connected to a lead 714 which provides −15 volts and pin 8 is grounded through a lead 716.

Lead 706 is fed through a 4.53 kilohm resistor 720 which has connected in parallel with it a 402 kilohm resistor 722 and a 500 kilohm rheostat 724. Thus, the total resistance through the combination of resistances 720, 722 and 724 can be precisely set to control the current through the lead 730 to the RTD. An LT1013 operational amplifier 740 also precisely provides a voltage reference signal on a lead 742. A 0.1 microfarad feedback capacitor 743 reduces transients. The output of the RTD is fed on a lead 744 to an AD620 instrumentation amplifier 746 at its inverting terminal 748. The amplifier 746 also receives the −100 millivolt reference signal through a 100 ohm resistor 750 fed past a grounded 0.1 microfarad capacitor 752 to the non-inverting input terminal 754. The instrumentation amplifier 746 provides an output at an output terminal 756 which is fed through an 8.06 kilohm resistor 758 and an 8.06 kilohm resistor 760 to an LT1013 operational amplifier 764 which provides a gain of about 2 to a signal supplied to a 100 ohm resistor 766 connected to the VOUT lead 708. The operational amplifier 764 also has a 16.2 kilohm resistor 770 and a 2200 picofarad capacitor 772 connected in parallel in a feedback loop 774 coupled to an inverting input terminal 776 of the amplifier 764. Thus, the temperature module 700 provides an analog output temperature signal on line 708 related to the temperature of the RTD associated with the tank, which output signal is fed back through pin 4 to other portions of the circuit.

Both the pressure transducer modules 600 and the temperature modules 700 are coupled through their respective 8-pin connectors 602 and 702 to the multi-pin analog back plane 70. Further detail of the multi-pin analog 70 is shown in FIG. 14.

In order to energize the pressure transducer module 600 and the temperature module 700, power is received from the ±15 volt power supply 36 which is fed over a power supply bus 37 as may best be seen in FIG. 18. Power supply bus 37 includes a +15 volt line 810, a second +15 volt line 812, a plurality of common lines 814, 816 and 818 and a pair of −15 volt lines 820 and 822. All of these lines are coupled through a 7-pin connector 826 and the bus 37 to the power supply 36. They, in turn, feed a multi-pin connector 830 that is coupled to a mating 832 shown in FIG. 14.

Figure 14:
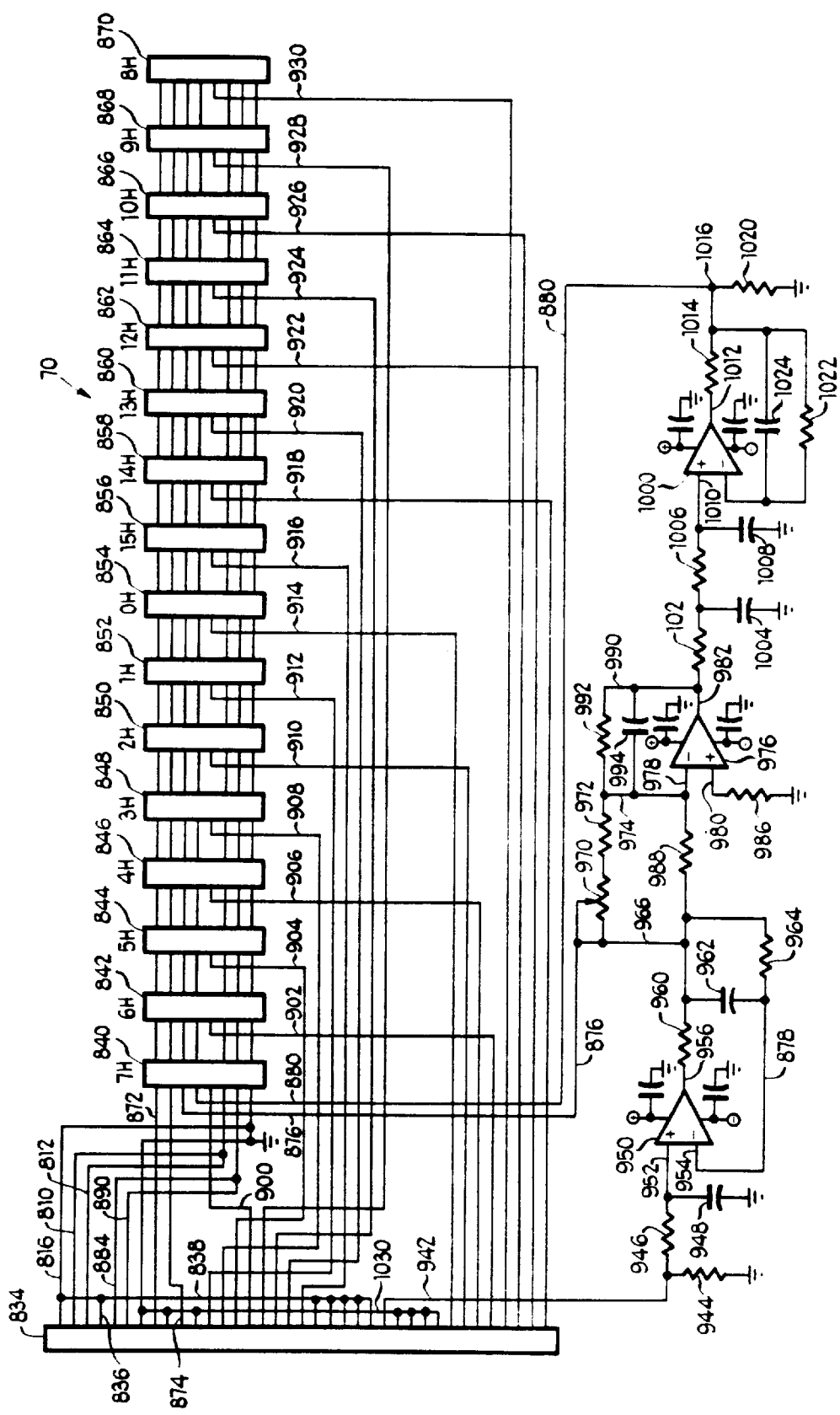
FIG. 14 is a schematic diagram of an analog signal back plane and voltage reference generator.

As shown in FIG. 14, the lead 816 is a shield line and is strapped to a common line 836. The common line 836 has a strap connector 838 connected across it and other lines as well. Lead 816 has connected to it a plurality of 8-pin connectors 840, 842, 844, 846, 848, 850, 852, 854, 856, 858, 860, 862, 864, 866, 868 and 870. Each of the 8-pin connectors has its first pin connected to a VOUT2 line 872. Each of the connectors has its second pin connected to a VOUT1 line 874. Each of the connectors has its third pin connected to a +4.5 volt reference line 876 to receive a reference signal from a reference signal portion 878 of the back plane 70. More specifically, the circuit 878 is a −100 millivolt reference circuit having several stages, the first one of which generates the 4.5 volt reference signal fed to line 876 as will be seen hereinafter. The fourth pin is connected via a line 880 to the output of the −100 millivolt reference circuit 878 to receive a temperature null reference signal therefrom which has been highly regulated. This temperature null reference signal is supplied to the temperature modules 700, as was set forth above, at their pin 4's. Each of the fifth pins for the connectors 840 through 870 is dedicated to a separate analog voltage output line which is fed back to the connector 834 as will be seen hereinafter. The number 6 pins are each connected to the +15 volt line 810. The number 7 pins are each connected to a −15 volt line 884. Each of the number 8 pins is connected to the shield line 816 and to a ground line 890. The output signals from the various pressure transducer modules 600 and temperature modules 700 are fed out through their pin 5's through the various connectors 840 through 870 to which they are connected.

As shown in FIGS. 14 and 18, the leads 902 through 930 are each individual voltage output leads which are fed back through the connectors 834 and 830 to a 40-pin connector 940 that is coupled to the bus 64. Included in the leads from that 40-pin connector is a voltage reference lead 942 which supplies the +4.5 volt voltage reference signal from the connector 940 through the connector 830 to the connector 834 and ultimately to a grounded 4.99 kilohm resistor 944 of the −100 millivolt reference circuit 878. An 8.06 kilohm resistor 946 is connected also to receive the signal from the lead 942 and has a 0.33 microfarad capacitor 948 connected between it and ground. A OP07 operational amplifier 950 having a non-inverting terminal 952, an inverting terminal 954 and an output terminal 956 is connected at its non-inverting terminal 952 to receive the signal from the node between the resistor 946 and the capacitor 948. A further regulated output voltage is supplied through a 100 ohm output resistor 960 which feeds a 0.33 microfarad feedback capacitor 962 connected to the inverting terminal 954. A parallel 8.06 kilohm feedback resistor 964 also comprises a portion of the feedback path of the amplifier 950. The output voltage is fed over the line 966 to the line 876 which supplies the 4.5 volt reference signal. That reference signal may be adjusted slightly by variation of a 500 kilohm potentiometer 970 connected to the line 966. A 402 kilohm resistor 972 is connected to the potentiometer 970 and is connected via a lead 974 to an LT1013 operational amplifier 976 at its non-inverting terminal 978. The amplifier 976 also includes an inverting terminal 980 and an output terminal 982. A grounded 100 ohm resistor 986 is connected to the inverting terminal 980. A 4.53 kilohm input resistor 988 is connected to the line 974 at the non-inverting terminal 978. A feedback loop 990 having a 100 ohm feedback resistor 992 and a 0.1 microfarad feedback capacitor 994 is connected between the output terminal 982 and the non-inverting input terminal 978. An LT1013 gain-of-two operational amplifier 1000 is coupled by an 8.06 kilohm resistor 1002, a grounded 0.33 microfarad capacitor 1004, an 8.06 kilohm resistor 1006, a second grounded 0.33 microfarad capacitor 1008 to its noninverting terminal 1010 and supplies an output signal at its output terminal 1012 fed through a 100 ohm resistor 1014 to a node 1016 at which point the −100 millivolt reference signal is provided. A grounded 10 kilohm resistor 1020 is also connected to the node 1016 as are a 16.2 kilohm feedback resistor 1022 and a 2200 picofarad capacitor 1024. The −100 millivolt reference signal is supplied over the line 880 to each of the connectors 840 through 870 to be used by the temperature modules 700 as a temperature null reference signal for the RTD probes. It may also be appreciated that a strapped lead 1030 corresponding to a strapped lead 1032 in FIG. 18 which is grounded has all of its terminals grounded as well.

As shown in FIG. 18, an interrupt driving circuit 1033 as may best be seen in FIG. 18 is provided to send an interrupt signal out of an interrupt connection plug 1033*a* over an interrupt bus 1034 to the opto coupler 54. The interrupt circuit 1033 includes a first comparator stage 1036 connected to lead 904, a second comparator stage 1038 connected to lead 902 and a third comparator stage 1040 receives a signal from lead 900. Each of the comparators is fed with the +4.5 volt voltage reference signal from lead 942. The comparator 1036 drives an output transistor 1050, the comparator 1038 drives an output transistor 1052, the comparator 1040 drives an output transistor 1054. If any of the comparators receives a signal, the transistors turn on, pulling the lead 942 low which sends a low signal through the connector 1033*a* to the opto coupler 54 and ultimately back to the digital board 44 to signal the CPU 40 that one of those three leads has gone high. This would indicate that one of the two 0–50 volt pressure transducers 84 or 132 has reached the end of its travel indicating that the pressure in the system exceeds 50 pounds per square inch and that a system shut-down should take place.

Referring now to FIGS. 13A and 13B, the analog circuit 47 is shown therein. The analog circuit 47 is connected via a standard multi-pin connector 1060 to the STD bus 42. The analog circuit 47 receives signals through a multi-pin connector 1062 connected to the multi-pin connector 940. The connector 1062 primarily receives selected output voltage signals from the multiple parallel connectors 840 through 870 to which the pressure transducer circuits 600 and the temperature circuits 700 feed their output signals. As may best be seen in FIG. 13B, a primary voltage reference generator 1070 produces the primary +4.5 volt reference signal. The voltage reference generator 1070 includes an LM234Z-3 current generator 1072 that is driven from a voltage source 1074. A forward poled IN4148 diode 1076 is connected to the current generator 1072 and a supply lead 1078 is connected to the diode 1076. A reverse biased LT1004-2.5 Zener diode 1080 is connected to the junction of the diode 1076 and the lead 1078 to supply a regulated voltage on the line 1078 to a 10 kilohm resistor 1082 connected thereto. A 0.1 microfarad capacitor 1084 is connected between the line 1078 and ground. A 0.01 microfarad capacitor 1086 is connected between the resistor 1082 and ground and is also coupled to an OP400GP operational amplifier 1090 at its non-inverting input terminal 1092. A 10 kilohm resistor 1094 is connected via a 10 kilohm resistor 1096 between the current source 1072 and the resistor 1082. A lead 1098 connects the junction of the resistors 1094 and 1096 to the current source 1072. The amplifier 1090 has connected to it a feedback circuit 1100 comprising a 0.01 microfarad capacitor 1102 connected in parallel with a 10 kilohm resistor 1104. The feedback path 1100 is connected between an output terminal 1106 and a non-inverting input terminal 1108 of the operational amplifier 1090. A lead 1110 is connected to a lead 1112, including a voltage tap point 1114, at which a regulated 2.5 volt signal may be tapped off for use in other portions of the circuit should it so be desirable.

An additional stage 1116 of the voltage regulator provides a −5 volt regulated voltage at a test point 1118. The −5 voltage stage 1116 is coupled via a pair of resistors 1120 and 1122 to the lead 1110 to receive the 2.5 volt signal therefrom. An OP400G operational amplifier 1124 having a non-inverting input terminal 1126, an inverting input terminal 1128 and an output terminal 1130 has its non-inverting input terminal connected via a 6.65 kilohm resistor 1132 to ground. The output terminal 1130 is connected via a feedback circuit 1134 to the inverting input terminal 1128. The feedback circuit 1134 includes a 0.01 microfarad capacitor 1138 connected in parallel with a 20 kilohm resistor 1140 and a second resistor 1142.

An additional off-card voltage regulator stage 1150 is connected via the lead 1112 to be driven by the 5 volt signal from the amplifier 1090. This stage provides the +4.5 volt reference signal on the lead 942 which is supplied to the temperature modules 700, the pressure transducer modules 600 and to the −100 millivolt voltage reference module 878. The 5 volt signal on the lead 1112 is supplied to a 10 kilohm resistor 1154 and a parallel resistor 1156. Transients are shunted away from an OP400G operational amplifier 1160 by a grounded 0.01 microfarad capacitor 1162. The signal is received by the amplifier 1160 at its non-inverting input terminal 1164. The amplifier 1160 generates the +4.5 volt output signal at an output 1166 which may be tapped via a test point 1168. A feedback loop 1170 includes a 20 kilohm resistors 1172 and a parallel resistor 1174 connected in parallel with a 0.01 microfarad capacitor 1176 connected to the non-inverting input terminal 1178 of the amplifier 1160. The 4.5 volt reference signal is also supplied via a lead 1184 for use in an analog-to-digital converter as will be apparent hereinafter.

In order to meet high current demands for the off-board pressure transducer modules, temperature modules and the −100 millivolt reference signal module, an essentially unity gain amplification stage 1190 is coupled to the output 1166 of the operational amplifier 1160. The driver stage 1190 includes a 2 kilohm resistor 1192 to which is coupled a 0.01 microfarad grounded capacitor 1194. The resistor 1192 feeds D.C. current to an OP400G operational amplifier 1196 at its non-inverting input terminal 1198. The amplifier 1196 also has an inverting input terminal 1200 and an output terminal 1202. The output terminal 1202 drives a 1 kilohm resistor 1204 coupled to a 2N4401 NPN bipolar transistor 1206 at its base 1208. A 10 kilohm biasing resistor 1210 is coupled between the resistor 1204 and the base 1208 and to ground. The transistor 1206 is energized through its collector 1212 and supplies a regulated current or a line 1214 to a 200 ohm lead resistor 1216 to which is connected the lead 942. A 1 kilohm feedback resistor 1218 is connected to the resistor 1216 and to the input terminal 1200. A 0.01 microfarad feedback capacitor 1222 is connected in parallel with the resistor 1218. The driver stage 1190 enables the voltage reference circuit 1070 to supply highly regulated 4.5 volt voltage reference signals on the line 942 irrespective of changes in the load due to the number of pressure transducer or temperature modules or changes in the current draw of those modules during use.

As is best seen in FIG. 13A, the multi-pin connector 1060 is coupled to portions of the STD bus 42. A pair of +5 volt D.C. leads 1240 and 1242 provide positive D.C. power for the other portions of the circuit 47. An auxiliary positive supply voltage lead 1244 and an auxiliary negative supply voltage lead 1246 are also driven from the STD bus. A pair of auxiliary ground leads 1248 and 1250 provide a ground circuit lead. A pair of regular ground leads 1252 and 1254 are coupled to the card edge. A 74LS682 octal decoder 1260 has its P0 and P1 pins strapped high. The $\overline{\text{IOEXP}}$, $\overline{\text{IORQ}}$, A4, A5, A6 and A7 signals are fed to the octal decoder 1260 at its pins P2 through P7. Pins 02, 03, 04, 05, 06 and 07 are strapped low via a jumper 1270. Leads A8, A9, A10, A11, A12, A13, A14 and A15 from the STD bus 42 are coupled to pins P0, P1, P2, P3, P4, P5, P6 and P7 of a 74LS682 octal decoder 1272. Pins 00 and 01 are left floating, while pins 02, 03, 04, 05, 06 and 07 are strapped low by a grounding assembly 1274. Leads A0, A1, A2, A3, $\overline{\text{WR}}$, $\overline{\text{RD}}$, $\overline{\text{CLOCK}}$ and $\overline{\text{MCSYNCH}}$ are connected to a 74LS244 octal buffer 1276 at its pins IA0, IA1, IA2, IA3, IB0, IB1, IB2, IB3. Pins OEA and OEB are strapped low. Data input leads D0, D1, D2, D3, D4, D5, D6 and D7 are connected to a 74LS245 bus transceiver 1280 at pins A0, A1, A2, A3, A4, A5, A6 and A7.

The octal decoder 1260 produces a $\overline{\text{BSLO}}$ signal on a line 1290 coupled to a GAL16V8 programmable array logic device 1292. The octal decoder 1272 produces a $\overline{\text{BSHI}}$ signal on a line 1300 also fed to a GAL16V8 programmable array logic device 1292. PAL 1292 is driven by signals from the octal buffer 1276 derived from the CLOCK and MCSYNCH signals from the standard bus. The PAL 1292, in turn, produces a $\overline{\text{BRD-SEL}}$ signal on a line 1302 which is fed to the $\overline{\text{CE}}$ terminal of the bus transceiver 1280 to determine when 8-digit numbers on the bus transceiver 1280 may be fed out of the bus transceiver 1280 to the STD bus 42. Those 8-bit numbers are provided by an analog-to-digital converter as will be seen hereinafter. In addition, the bus transceiver 1280 receives information related to the channel to be selected of the pressure transducers or the temperature modules to be selected and places that information on a data bus 1310 which is coupled to a 74LS373 octal latch 1312. Likewise, the data bus 1310 is coupled to an 82C54 timer 1314 and a second octal latch 1316. The octal latch 1312 feeds a 74LS197 quad counter 1330 which generates a 3-bit output signal on a multiplexer address bus 1332 coupled to a pair of HI-508 8-port multiplexers 1348 and 1350. Multiplexer 1348 is connected to voltage output lines 916, 918, 920, 922, 924, 926 and 928. Multiplexer 1350 is coupled to voltage output lines 900, 902, 904, 914, 912, 910, 908 and 906. In addition, a MUX select line 1354 is coupled directly to an enable pin of the MUX 1348 and is coupled through a NAND gate 1356 via a line 1358 to an enable pin of the MUX 1350. The NAND gate 1356 functions as an inverter. A crystal controlled clock 1360 provides a clock output signal on a line 1362 to a 74LS197 quad counter 1364 having a counter output bus 1366 coupled by a jumper 1368 to a CLKIN port of a CS5016 analog-to-digital converter 1370. The MUX 1348 has its OUT port connected to a multiplexer output line 1374 and the MUX 1350 has its output line connected via a lead 1376 to lead 1374 which feeds an amplifier 1378. The amplifier 1378 receives the signal from line 1374 at a non-inverting input terminal 1380. Its inverting input terminal 1382 is coupled in a feedback loop with its output terminal 1384 via a 4700 picofarad capacitor 1386. A 10 ohm resistor 1388 is also coupled to the output port 1384 and a 200 ohm feedback resistor 1390 is coupled to resistor 1388 and to inverting input terminal 1382. A pair of diodes 1400 and 1402 are connected to line 1404, which is coupled to the resistor 1388. The diodes provide protection to the analog-to-digital converter 1370 which is connected at its VIN port to the line 1404 to receive the analog input signal selected by the MUXs, which analog input signal is representative of the voltage of either a pressure transducer or a temperature input module. The analog-to-digital converter then produces an 8-bit digital output signal on the bus 1310 representative of the sensed pressure transducer or selected temperature signal which is fed via the bus transceiver 1280 to the standard bus data lines DO through D7 where it can be processed by the CPU 40.

As may best be seen in FIG. 9, the apparatus 10 operates by having the CPU set up the variables in a step 2000 by setting the variables equal to 0, etc. The CPU 40 then determines whether an instruction has been given through the PC 46 to change the type of gas or vapor being flowed through the device under test in a change gas step 2002. If the gas is to be changed, the system is then pressurized and purged with the new gas over cycles in a step 2004. If the same gas is to be used, control advances to a step 2006 in which the gas is flowed through the device under test and into either the 300 cc tank or all four of the tanks in a step 2006. The data being fed back through the RTD sensors and the pressure transducers is digitized and fed to the CPU where the CPU tests for temperature changes of greater than 0.01° C. per second in a step 2008. If the temperature has changed by greater than 0.01° per second in the step 2008, the system enters a wait state a short time during which no gas is flowed in a step 2010. Gas flow is again started as control is returned to step 2006 and the temperature change is tested for in the step 2008. Assuming there has been no temperature change, the pressure values as evidenced by the digitized pressure readings are tested for in a step 2012. If the absolute pressure is less than or equal to the maximum pressure previously set, divided by ten, then the valves are closed to vacuum in a step 2014. If not, the pressure range is changed in a step 2016. A portion of the memory of the CPU card is filled with a set of pressure and temperature data in a step 2018 and the average flow rate is computed by executing the routine set forth in FIG. 20 and described hereafter. The flow value is then output either to memory or through the serial bus to the personal computer in a step 2022 and the absolute pressure is tested again to determine whether it is greater than 95% of the maximum pressure in a step 2024. If the absolute pressure is greater, control is transferred to step 2026 which commands the vacuum valve to be opened and the measuring routine is then exited in a step 2028. If the pressure has not reached 95% of the preselected maximum value, the measuring routine then acquires additional data in a step 2030 and control is returned to step 2002 via a loop to again compute the average flow for the data as set forth above.

Referring now to FIG. 20 the specific routine for determining the rate of flow from the pressure and temperature values is set forth therein. In a first step 2031, the presently known instantaneous pressure has subtracted from it the instantaneous pressure of one second ago to yield the rate of change of pressure with respect to time. In a step 2034 an average pressure is determined from the sum of the present pressure and the previously known pressure divided by two.

In a step 2036 percent atmosphere factor is determined from the ratio of the average pressure over a pressure of one atmosphere, e.g., 760 torr. The tank temperatures having been also supplied to the CPU 40, the current average tank temperature plus the tank temperature one second ago divided by two is determined in a step 2038. That average tank temperature over the last second is then used in a step 2040 to determine a factor $K_Z$ to be equal to the quantity $K_{Z1}$, which is found in a look-up table, divided by the quantity $1+K_{Z2}$ times the average temperature. $K_{Z2}$ is also stored in a look-up table. In a step 2042 the compressibility factor Z is determined to be one minus the quantity $K_Z$ times the percent atmosphere.

In a step 2044 a $K_V$ factor is determined to be the product of 60 times 273.15 divided by 760 in order to yield flow in standard cubic centimeters. In a step 2046 the actual flow rate is determined to be equal to the product of $K_V$, which is the product of the factors 60 times 273.15 divided by 760 which is equal to 215.65 times the rate of change of pressure with respect to temperature multiplied by the volume of the tank divided by the product of the compressibility factor times the current tank temperature. The routine then returns to the main routine set forth in FIG. 19.

If it is desired to provide a slightly more accurate flow rate, in other words a predicted flow rate, an additional factor can be used wherein the second derivative of pressure with respect to time is calculated in the CPU to provide a second derivative or change estimator which may be applied to the flow equation to provide a predicted flow factor to reduce any small amount of latency which may have resulted from the calculation time.

Thus, the instant invention provides an advantageous apparatus and method for accurately determining a rate of flow through a device under test such as a secondary mass transfer standard. The apparatus avoids errors which were previously encountered with rate of rise pressure systems due to the temperature within the volume changing as gas is compressed or expanded during the flow measurement. In addition, the instant invention provides accurate flow output even for gases having compressibility factors which significantly depart from unity and which significantly vary with respect to pressure and time.

While there has been illustrated and described a particular embodiments of the present invention, it will be appreciated that numerous changes and modifications will occur to those skilled in the art, and it is intended in the appended claims to cover all those changes and modifications which fall within the true spirit and scope of the present invention.

What is claimed:

1. Apparatus for measuring the flow rate of a gas, comprising:

means for communicating a flow of gas;

a volumetric container connected to the gas indicating means and defining a gas receiving volume;

means for measuring a gas pressure within the gas receiving volume; and means for maintaining the gas receiving volume substantially isothermal during pressure changes of the gas, said isothermal maintaining means comprising a plurality of substantially identical dished vaned disks, edges of the vanes of the disk contacting an interior wall of the volumetric container in good heat conducting relationship therewith, said disks being stacked within the volumetric container loosely in a column with adjacent disks being oriented in opposite directions so that when said container is closed compression is placed upon the column of disks causing the diameters of the disks to increase slightly bringing their vane edges into good heat conducting engagement with the walls of the volumetric container.

2. Apparatus for measuring a flow rate of a gas according to claim 1 wherein said isothermal means comprises a heat conductor.

3. Apparatus for measuring a flow rate of a gas according to claim 1 wherein said volumetric container comprises a metal right circular cylindrical container.

4. Apparatus for measuring a flow rate of a gas according to claim 1 wherein said volumetric container further comprises a pair of flat end plates.

5. Apparatus for measuring a flow rate of a gas according to claim 4 wherein a right circular cylinder is positioned between said flat end plates.

6. Apparatus for measuring a flow rate of a gas according to claim 1 further comprising means for determining a rate of change of the gas pressure within the volumetric container.

7. Apparatus for determining a mass rate flow of a gas, comprising:
   means for communicating a flow of gas;
   means connected to said gas communicating means, for capturing a flow of gas within a volume defined by walls of precisely known dimension or for emitting a flow of gas;
   means positioned within said volume for holding gas within said volume and substantially isothermal relationship for the wall of said volume during pressure changes of said gas, said isothermal maintaining means comprising a plurality of substantially identical dished vaned disks, edges of the vanes of the disk contacting an interior wall of the volume in good heat conducting relationship therewith, said disks being stacked loosely in a column with adjacent disks being oriented in opposite directions so that when said volume is closed compression is placed upon the column of disks causing the diameters of the disks to increase slightly bringing them into good heat conducting engagement with the wall of the volume; and
   means for determining an instantaneous pressure within said volume.

8. Apparatus for determining a rate of flow of gas according to claim 7 wherein said volume is defined by thick thermally conducting walls for good heat conduction.

9. Apparatus for determining a mass rate of flow of gas according to claim 7 wherein said isothermal means comprises a plurality of thermally conducting elements positioned within said volume and in good contact with the walls thereof.

10. Apparatus for determining a rate of flow of gas according to claim 9 wherein said isothermal means further comprises a thermally conducting matrix which is thermally conductive and in contact with the walls of the container for carrying heat generated by adiabatic compression or expansion of said gas to said walls of container for maintaining said gas at substantially ambient temperature.

11. Apparatus for determining a mass rate of flow of gas according to claim 7 wherein said volumetric means comprises a cylindrical thermally conducting tank having a precisely known volume and said isothermal means comprises a plurality of disks positioned in contact with the interior walls of said cylindrical thermally conducting tank for maintaining a temperature of gas within said cylindrical thermally conducting tank at an isothermal condition during pressure changes of the gas.

12. Apparatus for determining a mass rate of flow of gas, comprising:
   means for communicating a flow of gas; a volumetric container connected to the gas communicating
   means and defining a standard volume interior;
   means for measuring a gas pressure within the standard volume interior;
   means for measuring a gas temperature within the standard volume interior;
   means for maintaining the standard volume interior substantially isothermal during pressure changes of the gas, said isothermal maintaining means comprising a plurality of substantially identical dished vaned disks, edges of the vanes of the disks contacting an interior wall of the standard volume interior in good heat conducting relationship therewith, said disks being stacked within the volume loosely in a column with adjacent disks being oriented in opposite directions so that when said volume is closed compression is placed upon the column of disks causing the diameters of the disks to increase slightly bringing them into good heat conducting engagement with the wall of the volume;
   means for determining a compressibility factor of the gas at the measured pressure and temperature; and means for determining the flow rate based upon the rate of change of the pressure and the compressibility of the gas.

* * * * *